United States Patent [19]

Lewis et al.

[11] 4,103,093

[45] Jul. 25, 1978

[54] NOVEL METHACRYLIC POLYMERS HAVING CONDENSATION-CROSSLINKABLE FUNCTIONALITY

[75] Inventors: Sheldon N. Lewis, Willow Grove; Richard A. Haggard, Fort Washington, both of Pa.

[73] Assignee: Rohm and Haas Company, Philadelphia, Pa.

[21] Appl. No.: 517,337

[22] Filed: Oct. 23, 1974

Related U.S. Application Data

[63] Continuation-in-part of Ser. No. 371,921, Jun. 20, 1973, abandoned, which is a continuation-in-part of Ser. No. 137,057, Apr. 23, 1971, abandoned.

[51] Int. Cl.² .............................................. C07C 69/54
[52] U.S. Cl. .................................... 560/205; 526/212; 560/222; 560/224; 560/221; 260/448.2 B; 260/465.9; 526/279; 526/310; 526/329.2
[58] Field of Search ............... 560/205, 222, 224, 221; 260/448.2 B, 465.9; 526/279, 310, 329.2

[56] References Cited

PUBLICATIONS

Stille, J. K. "Introduction to Polymer Chemistry" John Wiley & Sons, 48-61, 166-172.

Primary Examiner—Paul J. Killos
Attorney, Agent, or Firm—Harold L. Greenwald; William E. Lambert, III

[57] ABSTRACT

Polymers of esters of methacrylic acid having an average chain length of about 6 to about 50 mers are prepared by an anionic polymerization reaction, carried out in the presence of a chain-regulating alcohol and a catalytic amount of an alkoxide anion, in which control of the molecular weight and molecular weight distribution of the polymer are achieved by regulating the ratio of the total quantity of alcohol employed to the total monomer charge. These polymers, their hydrolysis products, and their derivatives having condensation-crosslinkable functionality have a wide variety of applications, including use as components in films, coatings, fibers, impregnants, adhesives, printing inks, and binders, and use as modifiers, plasticizers, melt flow improvers, and leveling agents.

26 Claims, 1 Drawing Figure

NOVEL METHACRYLIC POLYMERS HAVING CONDENSATION-CROSSLINKABLE FUNCTIONALITY

CROSS-REFERENCE TO RELATED APPLICATIONS

This application is a continuation-in-part of our pending application U.S. Ser. No. 371,921, filed on June 20, 1973 now abandoned, which is a continuation-in-part of our application U.S. Ser. No. 137,057, filed on Apr. 23, 1971 now abandoned.

This invention relates to novel homopolymers and copolymers of esters of methacrylic acid which have condensation-crosslinkable functionality, to polymer compositions which comprise these novel polymers, to methods of making the polymers, and to uses of the polymers.

Polymers having relatively low molecular weights, often referred to as oligomers, have recently become of increasing interest, in part due to their use in adhesives, plasticizers, leveling agents, and melt-index improvers, and in formulating coating compositions having very high solids content. While various alkyds, polyesters, polyethers, polyamides, and polyurethanes having molecular weights in the range of 500 to 2500 can be conveniently prepared, suitable acrylic polymers in this molecular weight range have heretofore been inaccessible. Because acrylic polymers have many extremely valuable advantages, including relatively low cost, low color, good outdoor durability, high chemical resistance, and good thermal stability, and because the various non-acrylic low molecular weight polymers with functionalities greater than two are often difficult to prepare, polymer compositions comprising low molecular weight acrylic polymers would be particularly desirable.

Attempts have been made to prepare acrylic polymers having molecular weight distributions in the range of 2500 to 10,000 by free radical polymerization techniques. However, these procedures are generally unacceptable, either because high temperature or high pressures are needed to carry out the polymerization reaction, because the chain transfer agent employed in the reaction has an objectionable odor or toxicity, or because the properties of the polymer produced in the polymerization reaction are adversely affected by a high incidence of initiator or chain transfer fragments in the polymer chains. Furthermore, it is difficult to control the molecular weight distribution of polymers prepared by free radical techniques. Thus, such polymers tend to have a broad molecular weight distribution, and contain significant amounts of high molecular weight polymer, which can give unattractive properties to the polymer compositions. It has now been found that novel polymer compositions free of the undesirable properties of prior art materials can be prepared by a novel anionic polymerization technique, which allows control of the polymer chain length and of the molecular weight distribution of the polymer.

According to the invention, novel polymer compositions are provided which comprise an anionically-polymerized addition homopolymer of an ester of methacrylic acid having condensation-crosslinkable functionality, or an anionically-polymerized addition copolymer of an ester of methacrylic acid having condensation-crosslinkable functionality with at least one other copolymerizable monomer. In the polymer compositions of the invention, the homopolymer or copolymer has an average chain length of about 6 to about 50 mers. In one preferred embodiment, the average chain length will be about 6 to about 25 mers, and in another preferred embodiment, the average chain length will be about 8 to about 20 mers.

As used in the present specification and claims, the term "condensation-crosslinkable functionality" is intended to refer to functional groups which can react with or as a crosslinking agent in conventional crosslinking reactions. Among the typical functional groups embraced by this term which characterize polymers of the invention are hydroxy groups, hydroxyalkylamino groups, 1,3-oxazolidinyl groups, amino groups, alkylamino groups, arylamino groups, functional quarternized amino groups, alkylchlorohydrin groups, epoxyalkyl groups, isocyanate groups, anhydride groups, 1,3-dioxolanyl groups, aldimino groups, ketimino groups, and the like. In the polymers of the invention, the condensation-crosslinkable functionality is located on the portion of the methacrylate ester normally derived from the esterifying alcohol. In a preferred embodiment of the invention, the polymers have an average of greater than about 2.5 crosslinkable groups per molecule, most preferably greater than about 3 crosslinkable groups per molecule, and about 15 to about 45 mole % of condensation-crosslinkable functionality.

The polymers of the invention are characterized by having not only low molecular weight, but also very narrow molecular weight distribution. Generally, at least about 85% by weight of the molecules of the homopolymer or copolymer in the polymer compositions have chain lengths falling between $\sqrt{2\bar{n}}$ and $2\bar{n}$, where $\bar{n}$ is the average chain length of the polymer. Thus, when the average chain length of the homopolymer or copolymer is about 6 mers, at least about 85% by weight of the molecules of the homopolymer or copolymer generally have chain lengths of about 3 to 12 mers, and when the average chain length of the homopolymer or copolymer is about 25 mers, at least about 85% by weight of the molecules of this homopolymer or copolymer generally have chain lengths of about 7 to about 50 mers. In a preferred embodiment of the invention, at least about 85% by weight of the molecules of the homopolymer or copolymer in the polymer compositions will have a chain length of about 4 to 40 mers. Depending upon the particular ester of methacrylic acid which is employed, and the particular comonomer which may be employed, the polymer compositions of the invention will have a molecular weight distribution (weight average molecular weight, $\overline{Mw}$) in the range of about 400 to about 10,000, and preferably about 500 to about 2500. The dispersities (ratio of weight average molecular weight to number average molecular weight) of the polymer compositions of the invention are also quite low, generally being about 1.1 to about 3, preferably less than about 2, and most preferably less than about 1.5.

The polymers of the invention preferably comprise mers having the structure wherein Y is a halogen atom, preferably a chlorine atom, an amino group, an alkylamino group, preferably having 1 to 4 carbon atoms in the alkyl substituent, a hydroxyalkylamino or bis-(hydroxyalkyl)amino group, preferably having up to 4 carbon atoms in the alkyl substituents, or a group of the formula —OZ, wherein Z is a hydrogen atom, an aminoalkyl group, preferably having 2 to 8 carbon atoms, an alkylaminoalkyl group, preferably having up to 6 carbon atoms, an isocyanatoalkyl group, preferably having 2 to 8 carbon atoms in the alkyl portion, a hydroxyalkyl group, preferably having 2 to 8 carbon atoms, a (1,3-oxazolidinyl-3-) alkyl group, preferably having 2 to 4 carbon atoms in the alkyl portion and optionally having up to two ($C_1$-$C_4$)alkyl substituents on the oxazolidinyl ring, an aldimino- or ketimino-alkyl or -alkoxyalkyl group, preferably having 2 to 6 carbon atoms in the alkyl or alkoxyalkyl group and derived from a 4-(1,3-dioxolanyl)alkyl group, preferably having 2 to 4 carbon atoms in the alkyl portion and optionally having up to two ($C_1$-$C_4$)alkyl substituents on the dioxolanyl ring, an epoxy ($C_2$-$C_4$)alkyl- di ($C_1$-$C_4$)alkylammonium ($C_2$-$C_4$) alkyl group, preferably a 2,3-epoxypropyldimethylammoniumethyl group, a 3-chloro-2-hydroxypropyldimethylammonium ethyl group, a 3-chloro-2-hydroxypropyl group, or a ($C_2$-$C_8$)epoxyalkyl group, preferably a 2,3-epoxypropyl group.

Z can also be a sodium ion, a potassium ion, an ammonium ion or other suitable cation. If the polymers contain less than 100% of the functional mers as defined above, they will generally also comprise mers of the structure (II)

wherein

Z' is an alkyl group, preferably having 1 to 24 carbon atoms.

In the accompanying drawing, which will make the nature of the present invention more readily apparent, the FIGURE represents a typical chain length curve for polymers of the invention, in which the molecular weight, as determined by calibrated gel permeation chromatography, is plotted against the percentage of each molecular weight fraction relative to the maximum molecular weight fraction. The average chain length, $n$, is then calculated by dividing the molecular weight at the distribution curve maximum by the molecular weight of the monomer. The shaded areas within the distribution curve represent the determination of the 90% distribution limits. The chain length, $\bar{n}$, at each of these limits is calculated by dividing the molecular weight at these points by the molecular weight of the monomer. The FIGURE represents the chain length distribution curve for an acid polymer similar to Example 36, in which the average chain length, $n$, is about 7 to 8 and 90% by weight of the molecules of the polymer composition have chain lengths of about 4 to about 11½.

Figure 1:
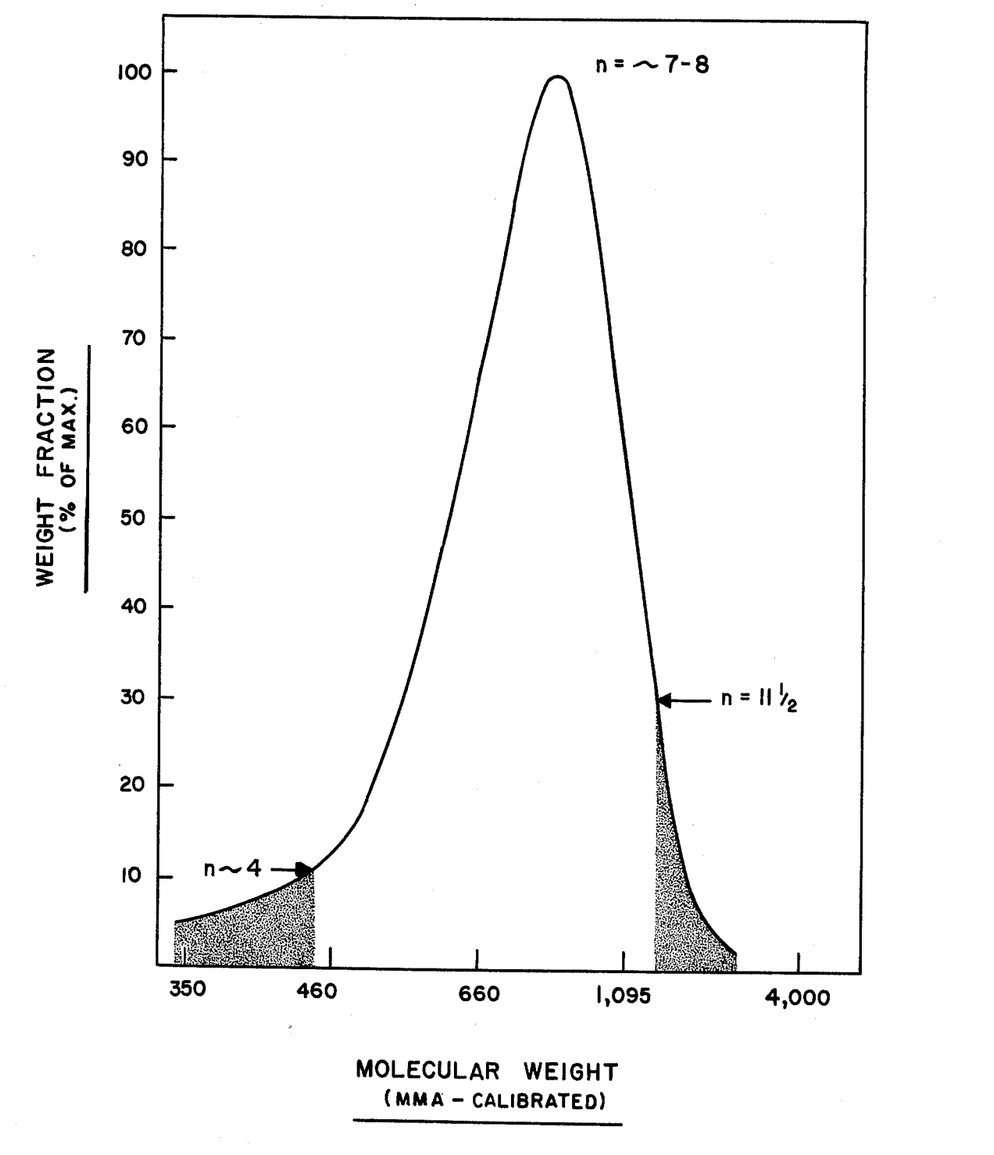

The polymer compositions of the invention of their precursors are produced by the anionic homopolymerization of an ester of methacrylic acid, or by the anionic copolymerization of an ester of methacrylic acid with at least one other copolymerizable monomer. The anionic polymerization reaction is carried out in the presence of an alkoxide anion, which serves as a catalyst, and an alcohol, which serves as a chain-regulating agent.

In general, most of the homopolymers of the polymer compositions of the invention can be represented by the following formula:

(III)

wherein

RO represents the residue of the chain-regulating alcohol used in the polymerization reaction, R'O represents the alcohol portion of the monomeric ester of methacrylic acid, and $n$ is an integer of 3 to 90, preferably 4 to 40, most preferably 5 to 25, and represents the chain length of the polymer.

The copolymers of the polymer compositions of the invention can be similarly represented, in general, by the following formula:

(IV)

wherein

RO and R'O are as defined above,

M represents the residue of the comonomer or comonomers, and $n'$ and $n''$ are integers of one or more, wherein the sum of $n'$ and $n''$ is 3 to 90, preferably 4 to 40, and most preferably 5 to 25.

It should be noted that the copolymers represented by Formula IV represent polymers of two or more monomers, and are random copolymers, so that Formula IV is only a simplified representation of the composition of these copolymers, and does not attempt to show their physical stereochemical structure. Furthermore, it should be noted that when RO differs from R'O in Formulas III and IV, scrambling of these groups by transesterification occurs to some extent during the polymerization reaction. Thus, in some of the homopolymers represented by Formula III and copolymers represented by Formula IV, RO will be replaced at some positions by R'O and R'O will be replaced at some positions by RO.

A wide variety of esters of methacrylic acid can be used in preparing the polymers of the invention and their precursors. Mixtures of these esters can also be used. Among the suitable esters which can be used are those having the formula (V)

wherein

R" is an alkyl group, preferably having 1 to 24 carbon atoms, most preferably 1 to 18 carbon atoms; an aminoalkyl group preferably having 2 to 8 carbon atoms, and optionally substituted on the nitrogen atom with one or two alkyl groups, preferably having 1 to 4 carbon atoms; an alkyl group, preferably having 2 to 8 carbon atoms, having a five- or six-membered heterocyclic ring as a substituent; an alkoxy-alkyl group, preferably having a total of 2 to 12 carbon atoms; an aryloxyalkyl group or aralkoxyalkyl group, preferably having 7 to 12 carbon atoms; an aralkyl group, preferably having up to 10 carbon atoms; or a similar alkyl or aralkyl group having substituents which will not interfere with the anionic polymerization of the ester.

In a preferred embodiment of the invention, R", whether substituted or unsubstituted, will have a total of up to 6 carbon atoms. Those esters of Formula III which do not themselves have condensation-crosslinkable functionality in the R" group are used as comonomers along with esters which do have condensation-crosslinkable functionality in the R" group or are converted to polymers having condensation-crosslinkable functionality by transesterification during polymerization or by postreaction of the polymer. The non-functional precursor polymers which are used in these postreactions are described and claimed in our U.S. Pat. application Ser. No. 517,336 entitled "Novel Polymers of Alkyl Methacrylates", filed on even dated herewith, assigned to a common assignee, and incorporated herein by reference.

Among the esters embraced by formula V are alkyl methacrylates, in which the alkyl group can have branched- or straight-chain, cyclic or acylic spatial configurations, such as methyl methacrylate, ethyl methacrylate, propyl and cyclopropyl methacrylates, butyl and cyclobutyl methacrylates, pentyl and cyclopentyl methacrylates, hexyl and cyclohexyl methacrylates, heptyl and cycloheptyl methacrylates, octyl methacrylates, nonyl methacrylates, decyl methacrylates, undecyl methacrylates, lauryl methacrylates, myristyl methacrylates, cetyl methacrylates, stearyl methacrylates, and the like, aralkyl methacrylates, such as phenylethyl methacrylates, phenylpropyl methacrylates, and the like, and aralkyl methacrylates, in which the aryl group is substituted with alkyl groups, halogen atoms, alkoxy groups, nitro groups, or similar substituents which will not interfere with the polymerization reaction, aminoalkyl methacrylates, such as aminoethyl methacrylate, methylaminoethyl methacrylate, dimethylaminoethyl methacrylate, ethylaminoethyl methacrylate, propylaminoethyl methacrylates, butylaminoethyl methacrylates, hexylaminoethyl methacrylates, ethylaminopropyl methacrylates, dimethylaminobutyl methacrylates, diethylaminoethyl methacrylates, and the like, alkyl methylacrylates having a heterocyclic group as a substituent on the alkyl group, such as morpholinoalkyl methacrylates, oxazolidinylalkyl methacrylates, piperidinoalkyl methacrylates, ketiminoalkyl methacrylates, ketals and acetals of glyceryl methacrylate, and the like, and alkoxyalkyl, aryloxyalkyl, and aralkoxyalkyl methacrylates, such as methoxyethyl methacrylate, ethoxyethyl methacrylate, butoxyethyl methacrylates, hexyloxypropyl methacrylates, ethoxypropyl methacrylates, propoxybutyl methacrylates, hexyloxyhexyl methacrylates, phenoxyethyl methacrylates, benzyloxyethyl methacrylates, and the like. Bis methacrylate esters of diols, such as the diester of 1,4-butanediol and methacrylic acid, can also be used. Other esters of methacrylic acid which do not contain substituents which would interfere with the anionic polymerization of these esters can also be used. Of course, M in Formula IV can also represent an ester of methacrylic acid, and Formula IV embraces copolymers in which two or more esters of methacrylic acid, with or without additional comonomers, are polymerized according to the process of the invention. The copolymerization of two or more different esters of methacrylic acid provides a useful method of incorporating different kinds of functionality into the polymer molecule. For example, copolymerization of at least one alkyl ester of methacrylic acid with at least one aminoalkyl ester of methacrylic acid provides a copolymer which can be phosgenated to produce a useful isocyanate-containing polymer, or quarternized to produce a water-soluble cationic polymer, or treated with epichlorohydrin and base to yield a water-dispersible cationic epoxy polymer.

As noted, above, the polymer compositions of the invention are produced by the anionic polymerization of the suitable monomer or monomers in the presence of an alcohol and an alkoxide catalyst. The final average molecular weight of the polymers produced in the anionic polymerization is a direct function of the overall molar ratio of the alcohol to the monomer. It has been found that two general approaches can be taken to obtain control of polymer molecular weight and molecular weight distribution to produce the polymer compositions of the invention.

In the first approach, which is a one-stage polymerization reaction, the molar ratio of the chain-regulating alcohol to the total monomer charge is maintained at a relatively constant value by addition of the alcohol throughout the polymerization reaction. Generally, it has been found that higher alcohol to monomer ratios will lead to slower polymerization rates and lower average molecular weight polymer compositions, while lower alcohol to monomer ratios will lead to faster polymerization rates and higher average molecular weight polymer compositions. Thus, by manipulating the molar ratio of the total quantity of the alcohol to the total monomer charge, some control of the molecular weight distribution of the polymer compositions of the invention can be obtained. Generally, the molar ratio of the alcohol to the total monomer charge will be from about 1:4 to about 1:50, and preferably from about 1:4 to about 1:25.

Either a batch or a gradual addition process can be employed to obtain the desired alcohol to monomer ratio. In the batch process, alcohol is added, at a rate consistent with the conversion of monomer to polymer, to a suspension or solution of the alkoxide catalyst in a solution of a portion of the total alcohol charge in the entire monomer charge. Generally, in the batch process, the concentration of the alcohol in the reaction mixture is kept relatively constant at about 0.05 to about 5 molar % of the total monomer charge, and preferably at about 0.1 to about 3 molar % of the total monomer charge. In the gradual addition process, both the monomer and the alcohol are gradually added to a suspension or solution of the alkoxide in an inert solvent or in a portion of the total monomer charge. The alcohol and the monomer can be gradually added to the polymerization separately or a solution of the alcohol in the monomer can be added. Generally, in the gradual addition process, the alcohol will be present at a level of about 2 to about 40 molar % of the total monomer charge, and preferably about 5 to about 25 molar % of the total monomer charge. At the conclusion of the addition of the alcohol or of the monomer and alcohol and a short holding period for polymerization to be completed, the alkoxide catalyst is neutralized with a suitable acid, such as a mineral acid or a carboxylic acid, as for example acetic acid, and the resultant salt is removed by filtration or washed from the reaction mixture with water. If a solvent is present, it can be removed by conventional techniques, such as evaporation or distillation under reduced pressure or extrusion.

In the second, and preferred, approach to making the polymer compositions of the invention, the polymers are produced in a two-stage procedure. As in the previous approach, the final average molecular weight is determined by the final ratio of total monomer to alcohol, but a narrower distribution about the average molecular weight can usually be achieved. In the first stage of the polymerization reaction, a polymer having a low molecular weight distribution, for example in which $n$ in Formula III is about 2 to 6, with an average of 3 to 4, is prepared by the batch or gradual addition techniques described above, using about 20 to about 60% by weight of the total monomer charge, and using a relatively high alcohol concentration, generally about 20 to about 50 mole % of the initial monomer charge. The remainder of the monomer charge, generally about 40 to about 80% by weight of the total monomer charge, is then added to the reaction mixture. The addition of the remaining monomer is exothermic and leads to a revised molecular weight distribution. This final average molecular weight distribution is determined by the molar ratio of the alcohol to the total monomer charge. The resulting polymer composition can then be worked up and purified as described above.

The rate of polymerization is influenced by many reaction variables, including the type and concentration of catalyst, the reaction temperature, the relative acidity of the chain-regulating alcohol, and particularly by the concentration of the chain-regulating alcohol in the reaction mixture at any given time.

The above polymerization reactions are generally run at a temperature of about 40° to about 130° C., and preferably about 60° to about 95° C. Since the polymerization reaction in these processes is exothermic, temperature control generally is maintained either by reflux or by external cooling. Although no solvent is necessary to carry out these polymerization reactions, a suitable organic solvent which is inert under the reaction conditions, such as toluene, xylene, or the like, can be employed. It may be particularly advantageous under some polymerization conditions to employ a solvent, for example, at about 10 to 20% by weight, in the later stages of the polymerization to maintain a viscosity which is more convenient for handling. The polymerization reaction is generally conducted at atmospheric pressure, although super- or subatmospheric pressures may be advantageous under some conditions.

The polymerizations of the invention are catalyzed by alkoxides. A wide variety of alkoxides can be used in the polymerizations of the invention, and generally any alkoxide derived from an alcohol having the formula R"OH, where R" is as defined in Formula V above, can be used. Mainly for economic reasons, simple normal alkoxides such as those of potassium and sodium, and particularly sodium methoxide and potassium methoxide are preferred as catalysts. Mixtures of alkoxides can also be used. However, by suitable choice of alkoxide, the rate of polymerization can be influenced greatly. The solubility of the alkoxide and the counter ion are factors which must be considered in assessing this influence. A polar organic cosolvent, such as, for example, dimethylformamide or dimethylsulfoxide, can also be used advantageously under some reaction conditions to improve the solubility and consequently the efficiency of the catalyst. Generally, the alkoxide will be present in the reaction mixture at a concentration of about 0.4 to about 4 mole %, and preferably about 0.6 to about 3.0 mole %, based on the total monomer charge.

A wide variety of alcohols can also be used as the chain-regulating agent in the polymerizations of the invention. Generally, the alcohol will have the formula R"OH, where R" is as defined in Formula III above. However, the alcohol used in the polymerizations need not be identical to the alcohols from which the monomer or monomers are derived. For example, functional alcohols can be conveniently used to impart condensation-crosslinkable functionality to the ultimate polymer through transesterification. In addition, mixtures of alcohols can be used.

One of the advantages of the polymerization processes of the invention is their minimization of very low molecular weight material, as well as high molecular weight material, in the polymer compositions of the invention. The very low molecular weight material, such as dimers and trimers, detracts from the useful characteristics of the polymer compositions. Not only does the very low molecular weight material represent a diversion of monomer from forming useful polymer, this material can react with intended coreactants in use formulations. Furthermore, when present in plasticizer compositions, low molecular weight polymers lead to volatility problems. Thus, the polymer compositions of the invention are quite useful in applications where significant concentrations of very low molecular weight polymers are to be avoided.

The polymer compositions have several advantages over conventional high molecular weight polymers. First, these compositions can be formulated at high solids levels, thus facilitating the application of the compositions as well as eliminating the ecological and human health problems associated with high concentrations of organic solvents. Second, the polymer compositions of the invention have a higher average number of terminal functional groups in proportion to the total number of polymer chains, thus improving the efficiency of their interaction in reactive systems. Third, the lower molecular weight and short average chain length of these compositions reduces chain entanglement, thus also increasing their reactivity. Fourth, the polymer compositions of the invention give reactive systems having high crosslink density and short polymer segments between crosslinks, thus providing rapid cure rates and cured polymers having excellent solvent, water, and detergent resistance properties, wear resistance, and weatherability. Fifth, the polymer compositions have high reactivity in postreactions, thus facilitating the formation of polymers having a high mole percent of reactive functionality. In general, then, the polymer compositions of the invention allow more efficient use of functionality and greater reactivity than the corresponding conventional polymers, without sacrificing any of the beneficial properties which these polymers possess.

The functional polymers of the invention are prepared by three major methods — polymerization with a functional monomer or comonomer, polymerization in the presence of a functional alcohol, and post-reaction of a polymer of the invention to introduce the desired functionality. In the first method, an ester of methacrylic acid which itself contains a suitable condensation-crosslinkable functional group is used as a monomer or comonomer in the polymerization reaction. Among such monomers are t-butylaminoethyl methacrylate, oxazolidinylethyl methacrylate, isopropyloxazolidinylethyl methacrylate, isopropylidene glyceryl methacrylate, γ-ketiminopropyl methacrylate, and similar functional monomers.

Another method for preparing polymers containing useful condensation-crosslinkable functional groups is to carry out the polymerization reaction in the presence of an appropriate functional alcohol. Since facile transesterification between the chain-regulating alcohol and the ester of methacrylic acid can take place during the polymerization reaction, the use of a functional alcohol as the chain-regulating alcohol will cause scrambling between RO and R'O in Formulas III and IV and thus introduce the desired functionality into the polymer. Among functional alcohols which can be thus employed are t-butylaminoethanol, N-hydroxyethyloxazolidine, γ-ketiminopropanol, ketals and acetals of glycerine, and the like.

Other polymers of the invention having condensation-crosslinkable functionality can be conveniently made by post-reactions involving any suitable functional group in the polymer. The various post-reaction techniques, such as transesterification, saponification, neutralization, amidation, quarternization, condensation, and the like, are well-known in the polymer art.

Hydroxyl functionality is generally introduced into the polymers of the invention by post-reacting a nonhydroxy polymer made according to the process of the invention, such as by transesterifying the ester groups with a polyhydroxy alcohol or esterifying a carboxyl functional polymer, prepared as described below, with a polyhydroxy alcohol. Polymers of the invention having hydroxyl functionality can also be prepared by using a monomer having hydroxyl functionality, such as hydroxyethyl methacrylate, hydroxypropyl methacrylate, or the like, or by carrying out the polymerization reaction in the presence of a polyhydroxy alcohol, such as ethylene glycol, propylene glycol, or the like. In a preferred embodiment of the invention, the polymers have about 20 to about 40 mole percent of hydroxyl functionality.

Polymers of the invention having hydroxyl functionality can be combined with crosslinking aminoplast nitrogen resins, including melamines, ureas, and guanidines, phenolic resins, including phenol-formaldehyde condensates, carboxyl-containing polymers, isocyanates, polyesters, polyfunctional acids, polyanhydrides, epoxides, and similar coreactive functional materials, to form reactive systems which can be formulated, crosslinked, and cured by conventional means and which have a wide variety of use applications, including the preparation of coatings, adhesives, films, fibers, powder coatings, caulks, sealants, binders for non-woven materials, molded plastics, and the like. Any of the conventional condensation-crosslinking nitrogen resins, phenolic resins, carboxyl-containing polymers including the carboxyl-containing polymers of the invention, polyesters, polycarboxylic acids, polyanhydrides, isocyanates, epoxides, and related crosslinking and coreactive materials commonly used in hydroxyl-reactive systems can be used with the hydroxyl-containing polymers of the invention. Generally, the hydroxyl-containing polymers and the coreactive materials will be combined in the same ratios as in the corresponding hydroxyl-reactive systems of the art, with a weight ratio of hydroxyl-containing polymer to coreactive materials of about 99:1 to about 1:99, and preferably of about 95:5 to about 5:95.

Among the epoxides which can be formulated and which will crosslink hydroxyl-containing polymers of the invention are the polyepoxide reaction products of epichlorohydrin with polyhydroxy phenols and with aliphatic polyols, the cycloaliphatic epoxides derived from various cycloalkenes, and the various ethoxyline resins available under the trade names of Epon or Araldite. See, for example, U.S. Pat. No. 3,533,935, of Lantz et al., granted Oct. 13, 1970. Suitable polyols from which polyepoxides can be prepared include ethylene glycol, propylene glycol, glycerol, trimethylol ethane, trimethylol propane, sorbitol, pentaerythritol, dipentaerythritol, tripentaerythritol, neopentylglycol, β-methylglycerol, diglycerol, polyethylene glycol, polypropylene glycol, and addition products of the described polyols with either ethylene oxide or propylene oxide or mixtures of ethylene oxide and propylene oxide. Cycloaliphatic epoxides include epoxyethyl-3,4-epoxycyclohexane (vinyl-cyclohexene diepoxide), limonene diepoxide, dicyclopentadiene diepoxide, bis(3,4-epoxycyclohexylmethyl)adipate, (3',4'-epoxycyclohexylmethyl)-3,4-epoxycyclohexane carboxylate, (3',4'-epoxy-6'-methylcyclohexylmethyl)-3,4-epoxy-6-methylcyclohexane carboxylate, 3-(3',4'-epoxycyclohexyl)-2,4-dioxaspiro(5.5)- 8,9-epoxyundecane, 3-(glycidyloxyethoxyethyl)-2,4-dioxaspiro(5.5)- 8,9-epoxyundecane and 3,9-bis(3',4'-epoxycyclohexyl)-spirobi(-meta-dioxane). Such epoxides are well-known and either commercially available or preparable by conventional means.

Another class of epoxides which can be used with the hydroxyl-containing polymers of the invention are the epoxide-containing polymers of the invention. These epoxy polymers are prepared from the acid-containing polymers of the invention by reaction with epichlorohydrin, followed by base-catalyzed epoxidation, or from the dialkylaminoalkyl polymers described in our application referred to on page 10 above by a similar reaction with epichlorohydrin and base-catalyzed epoxidation. These epoxides can also be formulated with the acid-containing polymers of the invention or with conventional polyhydroxyl or polycarboxy crosslinking agents to form condensation-crosslinkable reactive systems.

Among the nitrogen resins which can be formulated and which will crosslink hydroxyl-containing polymers of the invention are the reaction products of formaldehyde with urea, thiourea, biuret, N,N-ethyleneurea, N,N'-ethyleneurea, N,N'-dimethylurea, N,N'-diethylurea, N,N'-dimethoxymethylurea, N,N'-dimethoxymethylurea, N,N'-diethoxyethylurea, tetramethoxymethylurea, tetraethoxyethylurea, and dicyandiamide, acetoguanamine, benzoguanamine, formoguanamine, N-(t-butyl)melamine, N-(t-octyl)-melamine ammeline, 2-chloro-4,6-diamino-1,3,5-triazine, 2-phenyl-p-oxy-4,6-diamino-1,3,5-triazine, 6-methyl-2,4-diamino-1,3,5-triazine, 2,4,6-trihydrazine-1,3,5-triazine, 2,4,6-triethyltriamino-1,3,5-triazine and the N,N-dimethylmelamines, as well as their alkylated derivatives, obtained by treating the formaldehyde condensate with an alkanol or cycloalkanol, preferably having 1 to 6 carbon atoms.

Polymers of the invention having oxazolidinyl functionality are obtained by using a monomer having ox- azolidinyl functionality, including those described in U.S. Pat. No. 3,037,006, of Hankins et al., granted May 29, 1962, such as oxazolidinylethyl methacrylate, by carrying out the polymerization reaction in the presence of an alcohol having oxazolidinyl functionality, such as 3-hydroxyethyl-1,3-oxazolidine, 2-isopropyl-3-hydroxyethyl-1,3-oxazolidine, or the like, or by post-reacting an alkyl ester polymer made according to the process of the invention by transesterification with an alcohol having oxazolidinyl functionality. In a preferred embodiment of the invention, the oxazolidine level of the polymer will be about 15 to about 45 mole percent, and most preferably about 20 to about 40 mole percent. However, polymers having greater or lesser oxazolidine levels can also be prepared and used as described below. These polymers which contain oxazolidinyl functionality when formulated with polyisocyanates, including isocyanate-terminated prepolymers, are especially useful in moisture-curable systems, such as those described in United States patent application Ser. No. 7,270, U.S. Pat. No. 3,743,626, granted July 3, 1973, by W. D. Emmons, and incorporated herein by reference. In general, the ratio of molar equivalents of isocyanate to oxazolidine in the moisture-curable systems will be from about 1:10 to about 100:1 and preferably from about 1:1.1 to about 2.5:1. The moisture-curable systems are useful in forming coatings, adhesives, films, caulks, sealants, binders for non-woven fabrics, and the like.

Polymers of the invention having hydroxyalkylamide functionality are obtained by post-reacting an alkyl ester polymer made according to the process of the invention with an alkanolamine, a dialkanolamine, or an alkylalkanolamine, generally using a basic catalyst such as an alkali metal alkoxide. Hydroxyalkylamide functionality can also be obtained by the acid-catalyzed reaction of one of the acid or acid chloride polymers of the invention, which are described below, with a suitable hydroxyamine.

Carboxyl functionality can be introduced into the polymers of the invention by the selective hydrolysis of the terminal ester groups in an alkyl ester polymer made according to the process of the invention to an $\alpha$-monocarboxylic acid, having the formula wherein RO, R'O and $n$ are as defined above, or of the initial and terminal ester groups to an $\alpha,\omega$-dicarboxylic acid, having the formula wherein RO, R'O, and $n$ are as defined above.

Using conventional saponification procedures, it has been found that hydrolysis of the alkyl ester polymers under alkaline conditions proceeds relatively rapidly to yield selectively a monocarboxylic acid having Formula VI. Continued saponification selectively yields at a slower rate a dicarboxylic acid having Formula VII. Further saponification can be carried out to give polycarboxylic acids, and by control of reactant concentrations and reaction time, any desired degree of hydrolysis can be obtained. However, since saponification of the residual internal ester groups proceeds at a much slower rate than that of the end groups, selective conversion of the methacrylate polymers to either monocarboxylic or dicarboxylic acids can be accomplished. In a preferred embodiment of the invention, the polymers have about 15 to about 65 mole percent of carboxyl functionality.

Since the polymerization processes of the invention are not suitable for the direct preparation of acidic polymers by homo- or copolymerization of methacrylic acid, the hydrolysis products are of particular usefulness and importance. These acids, both in their free acid and salt form, are useful as plasticizers, hot melt coatings, adhesives, leveling agents, coalescent aids, dispersants, and as precursors in preparing other functional polymers.

When these acids are formulated with reactive cross-linking agents, such as epoxides, nitrogen resins, including melamines, ureas, and guanidines, isocyanates, hydroxyl-containing polymers, polyols, polyamines, hydroxy-alkylamides, phenolic resins, including phenol-formaldehyde condensates, and similar coreactive functional materials, reactive systems are formed which can be formulated, crosslinked, and cured by conventional means and which have a wide variety of use applications, including the preparation of coatings, adhesives, films, fibers, powder coatings, caulks, sealants, binders for non-woven materials, molded plastics, and the like.

Any of the conventional condensation-crosslinking epoxides, including those described above, nitrogen resins, including those described above, isocyanates, polyhydroxyl-containing polymers, including the hydroxyl-containing polymers of the invention, polyols, polyamines, polyfunctional hydroxyalkylamides including the polyfunctional hydroxyalkylamides of the present invention, and phenolic resins, and related crosslinking and coreactive materials commonly used in carboxyl-reactive systems can be used with the carboxyl-containing polymers of the invention. Generally, the carboxyl-containing polymers and the coreactive materials will be combined in the same ratios as in the corresponding carboxyl-reactive systems of the art, with a weight ratio of carboxyl-containing polymer to coreactive material(s) of about 99:1 to about 1:99, and preferably of about 95:5 to about 5:95.

These acids are also useful as intermediates, representing a convenient source, by means of reaction with ethylene oxide or propylene oxide, of polyhydroxyalkyl esters, which are useful in the preparation of urethanes and isocyanate prepolymers, by means of reaction with dihydroxy alcohols, of polyesters, which are useful in making fibers, coatings, and films, and by means of reaction with epichlorohydrin, of aliphatic polyepoxides, which are useful in coatings and other plastics applications. Polyalkylene oxide and sulfonato ethyl derivatives of the acids, useful in surfactant applications, can also be made.

The carboxylic acids of Formulas VI and VII can also be readily converted to the corresponding acid chlorides by treatment with known halogenating agents. Such acid chlorides are useful as intermediates in preparing derivatives of the acids, such as amides and substituted amides, and functional esters including dimethylaminoethyl, t-butylaminoethyl, oxazolidinylethyl, polyethoxy, sulfonatoethyl, trimethylammoniumethyl, and similar functional esters. The acid chlorides are also useful in the preparation of various polymers, for use as fibers, coatings, films, and the like.

On heating the polymers of Formula VII, at a temperature of about 180° to about 225° C., alcohol is cleaved generating an anhydride having the general formula (VIII)

wherein RO, R'O and $n$ are as defined above. Other polymers containing anhydride functionality are also produced in this reaction, including various bis- and poly-anhydrides, and Formula VIII is intended to represent but one type of such anhydrides. The conversion of the end groups to anhydride functionality aids in increasing the thermal stability of the polymers, and raises decomposition temperatures of the polymers to greater than 300° C. The anhydrides, including those having Formula VIII, are useful as coatings intermediates and as intermediates in making a wide range of other polymers.

The polymer compositions of the invention have a wide variety of uses. As described above, they are particularly useful as intermediates in preparing functionally modified reactive polymer compositions. They are also quite useful in forming films, coatings, such as in paints, lacquers, varnishes, and the like, powder coatings, impregnants, and adhesives for both natural and synthetic materials, such as paper, textiles, wood, brick, stone, ceramics, plastics, metal, and leather, as binders for non-woven fabrics, as plasticizers and modifiers for a wide variety of polymer compositions, as melting point depressants, as leveling agents and coalescent aids, and in a wide variety of other uses. Pigments, dyes, fillers, antioxidants, antiozodants, stabilizers, flow control agents, or other optional ingredients can also be included in polymer compositions of the invention.

When used as coatings, fillers or adhesives, the polymer compositions of the invention can be applied with or without a solvent by casting permanently or removably onto a suitable substrate. However, one of the advantages of the present invention is that reactive polymers can be prepared which can be applied as air-, moisture-, radiation-or thermally-cured coatings, fillers or adhesives without the use of any solvents, in either solid or liquid form as 100% solids compositions, or with a solvent in high solids compositions having less than 100% solids. For example, when water or an organic solvent is used, the reactive polymers are advantageously formulated at about 50 to about 100% by weight solids, and preferably greater than about 70% by weight solids. Among the organic solvents which can be used to formulate polymers of the invention and reactive polymer systems incorporating these polymers are hydrocarbons such as benzene, toluene, xylenes, and aromatic naphthas or mixtures of such solvents; esters such as ethyl, butyl, amyl, ethoxyethyl, or methoxyethyl acetates, lactates, or propionates; ketones such as acetone, methyl isopropyl ketone, methyl isobutyl ketone, dioxane, isophorone, and cyclohexanone; alcohols such as n-butanol, t-butanol, isopropyl alcohol n-propyl alcohol, amyl alcohols, and cyclohexanol; ethers, such as diethyl ether, the monoethyl ether of ethylene glycol, the monomethyl ether of ethylene glycol, and the monobutyl ether of ethylene glycol; and miscellaneous solvents including dimethylformamide, dimethylacetamide, acetonitrile, nitromethane, nitroethane, nitropropane, and nitrobutane; as well as mixtures of two or more solvent materials listed above. Another advantage of certain of the polymers of the invention is their high solubility in water, facilitating the formulation of waterborne reactive polymer systems. These properties are particularly desirable since minimization or elimination of volatile organic solvents also minimizes or eliminates potential ecological hazards.

Polymers of the invention can also be used in preparing powder coatings. The polymers are isolated, powdered, formulated, applied, and curved by conventional means to produce the desired coatings.

The following examples will further illustrate the invention but are not intended to limit it in any way. All parts are by weight and all temperatures are in degrees Centigrade unless otherwise noted. Example 1 shows three typical polymerization processes used to make the polymers of the invention as well as their non-functional precursors. Examples 2 to 21 show typical polymers used as precursors in making the polymers of the invention. Examples 22 to 30 show typical polymers of the invention made by processes similar to those shown in Examples 1, 31, and 32.

EXAMPLE 1

HOMOPOLYMERIZATION OF METHYL METHACRYLATE

Method A

This example shows a typical homopolymerization of an ester of methacrylic acid according to the "batch-type" polymerization process of the invention.

A clean, dry 3-neck flask equipped with mechanical stirrer, condenser and thermometer in a Y-arm side inlet, under dry nitrogen, is charged with commercially pure methyl methacrylate monomer, inhibited with 10 ppm of phenothiazine or dicyclohexyl phenylene diamine. The stirred solution is heated; upon warming to 60° C., it is charged with 0.6 mole % sodium methoxide and 3.0% methanol (added as a 25% by weight solution in methyl alcohol). The cloudy white mixture is heated to 93° C. over a 6-minute period and as the 75°–80° C. temperature is passed, methanol addition in aromatic solvent (xylene, toluene) is started via the side arm inlet at the rate of 0.35 mole % per minute for a period of 33 minutes (to a total of 15 mole % methyl alcohol addition). The gradually thickening and clearing solution is maintained at 93° ± 1° C. with stirring for an additional 2 hours. Xylene or toluene is added as diluent as needed for viscosity control. Analysis of the product solution by gas-liquid chromatography upon completion of the reaction time discloses less than 2% of residual methyl methacrylate and a trace (< 0.1%) of methyl alcohol.

Dimer and trimer levels are less than 3-4% and less than 8-10% by weight, respectively, as determined by quantitative gas-liquid chromatography and confirmed by gel permeation chromatography. The yellow to yellow-orange mixture is cooled to 60° C., the basic components are quenched with acid (for example, acetic, formic, HCl, $H_2SO_4$) removing essentially all color, and 1% by weight of a suitable filter aid is dispersed and stirred for 5-10 minutes. Pressure or aspirator filtration results in greater than 94% by weight, recovery of a clear, colorless to light straw solution of methyl methacrylate polymer. Analysis by gel permeation chromatography shows symmetrical weight distribution around 700-900 M.W., with greater than 85% by weight in the range of 300-1200. Unsaturation determination with solvent-stripped product typically shows less than 0.07 meq/g Similar procedures with differing methanol addition rates at constant catalyst level and 93° C. give the product distribution in Table I.

TABLE I

| Methanol Addition Rate (Mole %/Min.) | Total Alcohol Level (Mole % of Methyl Methacrylate Charged) | Product Appearance and Molecular Weight Distribution[1] |
| --- | --- | --- |
| 0.45 | 20 | Oil; 300-900 |
| 0.30 | 12-13 | Syrup[2]; ~400-1500 |
| 0.20 | 11 | Semi-Solid; 600-1600 |
| 0.10 | 8-9 | Brittle Solid M.P.> 40° C.; 800-3000 |
| 0.05 | 7 | Brittle Solid M.P.~50-80°; 1000-4000 |
| None | 3 | Brittle Solid M.P.~50-80°; 1000-10,000 |

[1] greater than 85% of the product weight contained in the limits specified; by gel permeation chromatography.
[2] at 80% by weight in solvent.

Method B

This example shows a typical homopolymerization of an ester of methacrylic acid according to a gradual addition polymerization process of the inventon.

To the apparatus described in Method A is charged 1.0 to 1.2 mole % (based on monomer to be subsequently added) of powdered potassium tert-butoxide or methoxide to enough toluene or xylene diluent to form a stirrable slurry. A solution of methyl methacrylate containing 15 mole % methanol, neat or about 10% by weight of toluene or xylene for viscosity control, is added dropwise to the stirred catalyst slurry at 65° C., at a rate sufficient to maintain reaction (added at 1.3-1.5% per minute for the first half of addition and about 1.0% per minute for the second half). The mixture readily takes on a pale yellow color and the viscosity noticeably increases after several percent of the monomer solution is added. Aliquots taken during and following monomer/alcohol addition establish that high conversion polymerization, with molecular weight distribution essentially constant, occurs throughout the addition period, that less than 10% residual monomer remains at the completion of addition. A short holding time at 65° C. reduces monomer levels to about 2%.

Following a 20 to 30 minute hold, the nearly clear, yellow oil is cooled to 60° C., quenched with 1.0-1.2% acetic acid (removing almost all color), treated with 1% by weight of a filter aid and vacuum or pressure filtered at 60° to 80° C. Gel permeation chromatography of the clear, colorless to light straw colored oil discloses the major weight fraction to be about 1200, with 90% by weight spread between 300 and 2600. Lower methanol levels yield successively higher molecular weight products of somewhat broader molecular weight distribution (see Table II).

TABLE II

Methyl Methacrylate Polymerization, Gradual Addition Process at 65° C.

| Methanol Level | Product $\bar{M}w$ (and 90 wt. % distribution) |
| --- | --- |
| 20% | 1100-1200 (300-2500) |
| 16 | 1200 (300-2600) |
| 12 | 1600-1700 (350-4000) |
| 10 | 1800 (350-4000) |

Method C

This example shows a typical homopolymerization of an ester of methacrylic acid according to the two-stage polymerization process of the invention.

To the apparatus described in Method A is charged 2.24 g. (20 mmole, 1.0 mole % based on total monomer) of powdered potassium tert-butoxide (or an equivalent molar charge of potassium methoxide) and about 10 g. xylene to form a stirrable slurry. Monomer solution (a) is prepared with 80 g. (0.80 mole, 40% of total monomer) methyl methacrylate, inhibited with 3 ppm dicyclohexyl phenylenediamine, and 9.6 g. (0.30 mole, 37.5 mole % of the initial methyl methacrylate charge, 15% of total monomer charge) anhydrous methanol; solution (a) is added over a 30 to 45 minute period to the stirred catalyst slurry at 60° to 65° C. The exotherm observed during the early stages of additon subsides and reaction temperature is maintained throughout addition and for a 45 minute post-addition hold. The reaction mixture is a mobile, hazy orange-yellow liquid containing 5-10% of free methyl methacrylate and 90-95% as dimer through hexamer ($n = 2-6$).

Monomer solution (b), consisting of 120 g. (1.20 mole, 60% of total monomer charge) methyl methacrylate and 25 g. xylene, is added dropwise over a 1-hour period at 60°-65° C. Exotherm occurs throughout this addition; gas-liquid chromatography of reaction aliquots discloses monomer levels at less than 1% and gel permeation chromatography indicates polymer growth paralleling addition. After the addition of solution (b), the hazy orange syrup (viscosity about 300 cps at 65°) is held at this temperature for 15 minutes, reducing methyl methacrylate level to essentially nil, and the catalyst is then quenched with 1.2 g. (20 mole) acetic acid. One gram of a filter aid is added to the nearly colorless syrup and dispersed with stirring for 5 to 10 minutes.

Vacuum or pressure filtration of the warm oil through warm funnel affords the product as a clear, light straw to colorless syrup in greater than 98% recovery. Gel permeation chromatography discloses $\bar{M}w$ approximately 720-750, with the distribution 300-1300.

When a total of 20 mole % methanol is used in the above procedure, polymer is obtained in greater than 95% yield with Mw about 620, spread from 250 to 1100.

In general, potassium n-alkoxides are preferred. Preparations made solely with initially soluble sodium methoxide as the catalyst are also successful, but require approximately 4 to 5-fold longer reaction times for 95% conversion at 90°-93° C. Gel permeation chromatography discloses a similar Mw, at 750-800 with a slightly broader distribution, 300 to 1600. Mixtures of potassium and sodium alkoxides can be used as catalyst to optimize the polymerization efficiency under different reaction conditions. While each of the above three methods can be used to prepare polymers of the invention, Method A and Method C are generally preferred since they yield polymeric products having narrower molecular weight distribution.

EXAMPLES 2 TO 30

Preparation of Methacrylate Homopolymers and Copolymers

Following the procedures of Example 1, a wide variety of methacrylate homopolymers and copolymers are prepared. Table III summarizes the polymerization conditions and properties of some typical methacrylate polymers of the invention.

TABLE III

Methacrylate Homo- and Co-Polymers

| Ex. | Monomer(s)[1] | Method[2] | Conversion[3] (Hours) | Alcohol Level[4] | Product $\overline{M}w$[5] | Chain Length[7] |
|---|---|---|---|---|---|---|
| 2 | MMA | A (93°) | 97.3% (2.5) | 18% (0.35) | 700 (300–1100)[6] | 6–7 (3–11) |
| 3 | MMA | A (93°) | 97 (2.5) | 15 (0.3) | 750 (300–1600)[6] (80%, 400–1300) | 7 (3–16) |
| 4 | MMA | A (93°) | 97 (2.0) | 8 (0.1) | 1600 (500–2500) | ~16 (5–25) |
| 5 | MMA | B (65°) | 96 (1.5)[8] | 12 | 1600 (400–3300) (80%, 430–2500) | ~16 (4–33) |
| 6 | MMA | B (80°) | 96 (2)[8] | 16 | 1200 (300–2400)[6] | ~12 (3–24) |
| 7 | MMA | B (100°) | <90 (5–6) | 15 | 1600 (400–2500) | 16 (4–25) |
| 8 | MMA | C (65°) | 99 (2)[8] | 15 | 750 (300–1600) (80%, 430–1300) | 7–8 (3–16) |
| 9 | MMA | C (65°) | 95 (ca. 4)[8] | 20 | 620 (250–1100)[6] | 6 (2.3–11) |
| 10 | MMA | C (93°) | <90 (6)[9] | 15 | 800 (300–1600)[6] | 7–8 (3–16) |
| 11 | BMA | A (98°) | 95 (3) | 11 (0.2) | 1400 (400–3200) | ~10 (3–23) |
| 12 | BMA | B (80°) | 96 (2.2)[8] | 12 | 2400 (400–6000) | 16–17 (3–40) |
| 13 | BMA | B (80°) | 96 (2.2)[8] | 15 | 1600 (400–5800) | 11 (4–40) |
| 14 | EMA | B (75°) | 96 (2.5)[8] | 15 | 1600 (350–6500) (80%, 450–5200) | 14 (3–60) |
| 14A | DMAEMA | B (80°) | 98 (2.5)[8] | 10 | 1200 (300–3500)[6] | ~7 (2–22) |
| 15 | BMA | C (80°) | 99 (4)[8] | 15 | 1000 (350–2200) | 6–7 (3–15) |
| 16 | 80 MMA/20 BMA | A (93°) | 96 (2.5) | 15 (0.35) | 1000 (350–1800)[6] | 9 (3–16) |
| 17 | 50 MMA/50 BMA | A (93°) | 95 (3.0) | 11 (0.2) | 1100 (400–2200) | 9–10 (4–18) |
| 17A | 72 MMA/28 DMAEMA | B (67°) | 95 (2)[8] | 12 | 1300 (300–2500)[6] | ~11 (3–21) |
| 18 | 77 MMA/23 LMA | A (93°) | 95 (2) | 13 | 1100 (400–2500) | ~8 (2–18) |
| 19 | 68 MMA/32 OXEMA | B (65°) | 96 (1.5)[8] | 12 | 2400 (500–6000) | 18 (3–45) |
| 20 | 75 MMA/25 i-BMA | B (95°) | 80 (incomp. at 4) | 5 | 1400 (400–3000) | 13 (4–27) |
| 21 | 50 MMA/50 i-BoMA | B (95°) | 93 (5) | 7 | — | — |
| 22 | 68 MMA/32 t-BAEMA | B (80°) | 96 (3)[8] | 12 | est. 1800 (400–3500) | est. 14 (3–27) |
| 23 | 75 BMA/25 OXEMA | B (80°) | 95 (2) | 12 | 1800 (500~6000) | 12 (3~30) |
| 24 | 78 BMA/22 OXEMA | A (93°) | 80 (5) | 3 | est. >2400 | est. >15 |
| 25 | 80 MMA/20 MAN | A (93°)[10] | 90 (3) | 8.5 (<0.1) | est. 2000 | est. >15 |
| 26 | 70 BMA/30 MAN | B (75°) | 83 (2½)[8] | 10 | 1400 (400–3000) | 11 (3–25) |
| 27 | MMA/(OXEMA)[11] | B (70°) | 90 (4)[8] | 22[11] | 700 (300–1600) | 6–7 (3–14) |
| 28 | BMA/(OXEMA)[11] | B (70°) | 94 (4)[8] | 12[11] | 1500 (400–3000) | 11–12 (4–24) |
| 29 | 64 MMA/36 IPOXEMA | B (80°) | 93 (2) | 12 | 1800 (500–5000) | 13 (4–40) |
| 30 | 70 BMA/30 OXEMA | C (65°) | 97 | 12[13] | 1200 (450–3200) | ~8 (3–22) |

TABLE III-continued

Methacrylate Homo- and Co-Polymers

| Ex. | Monomer(s)[1] | Method[2] | Conversion[3] (Hours) | Alcohol Level[4] | Product $\bar{M}w$[5] | Chain Length[7] |
|---|---|---|---|---|---|---|
| | | | (4)[8] | | | |

Additional Notes:

[1]The following abbreviations are used: MMA = methyl methacrylate; EMA = ethyl methacrylate; BMA = butyl methacrylate; t-BAEMA = t-butylaminoethyl methacrylate; LMA = lauryl methacrylate; OXEMA = 2-oxazolidinylethyl methacrylate; i-BMA = isobutyl methacrylate; i-BoMA = isobornyl methacrylate; IPOXEMA = 2-(2-isopropyloxazolidinyl)ethyl methacrylate; MAN = methacrylonitrile.

[2]A = Method A in Example 1; B = Method B in Example 1; C = Method C in Example 1; reaction temperature in ° C. in parentheses.

[3]Conversion determined by residual monomer via gas liquid chromatography; catalyst is 0.6 mole % NaOCH$_3$ in 3.0 mole % methanol unless otherwise noted.

[4]Method B, mole % alcohol on monomer; Method A, total mole % alcohol on monomer (added at the indicated mole %/min.); Method C, on total monomer, added in first stage.

[5]Weight average molecular weight ($\bar{M}w$) as determined by standardized gel permeation chromatography, based on methyl methacrylate polymer calibration (> 90 wt. % included in the M.W. distribution listed parenthetically); 80% distribution given in several typical examples.

[6]The lower $\bar{M}w$ polymers (i.e. those of $\bar{M}w$ less than 1300) contain about 4–8% by weight of polymer molecules under M.W. 400.

[7]Determined as in footnote 5; represents n in Formula III or (n' + n'') in Formula IV.

[8]The catalyst is 1.0–1.5 mole % powdered potassium methoxide or potassium t-butoxide.

[9]Sodium methoxide catalyst in methanol; reaction terminated before complete conversion.

[10]MAN added slowly to MMA/catalyst//MeOH mixture at reaction temperature.

[11]N-(2-hydroxyethyl)oxazolidine used as transesterifyingchain transfer alcohol.

The following examples 31 and 32 show methods of preparing the oxazolidine-containing polymers of the invention.

EXAMPLE 31

This example describes the preparation of a typical oxazolidine copolymer of the invention by copolymerization of an alkyl methacrylate and oxazolidinyl methacrylate in the presence of a non-function alcohol.

To a 2 l., 3-neck glass reaction flask equipped with reflux condenser, paddle stirrer, thermometer and addition funnel, all under dry N$_2$, are charged 30 g. toluene 59.5 g. (0.80 mole, 12% of total monomer) n-butanol and 7.4 g. (0.10 mole, 1.5 mole % of total monomer) potassium methoxide. The slurry is warmed and stirred at 60° C. The following solution is added dropwise during 20 to 30 minutes: 149 g. (0.80 mole) 2-(1,3-oxazolidin-3-yl)ethyl methyacrylate and 260 g. (1.82 mole) butyl methacrylate. The hazy, yellowing mixture requires 1 to 2 hours to convert greater than 90% of the monomers originally present to low molecular weight copolymer with relatively little exotherm.

The second stage charge, composed of a solution of 455 g. (3.20 moles) butyl methacrylate, 148 g. (0.80 mole) 2-(1,3-oxazolidin-3-yl)ethyl methacrylate and 45 g. toluene, is added by dropwise addition at 60° to 65° C, during 2 to 3 hours. Cooling is necessary throughout addition to maintain temperature under 70° C., maximum. The mixture thickens gradually with addition/conversion. After addition is completed, the orange-amber, nearly clear oil is held at 60° to 65° C for one-half hour, during which time final monomer levels are reduced below 1%.

The solution is cooled to 50° C., the catalyst is quenched dropwise with 6.0 g. (0.10 mole) acetic acid, and the solution is filtered. The filtered product is a clear light yellow-orange oil containing 92 weight % solids, viscosity 9500 cps (25° C), and 1.36 meq. amine titer per gram of solution. Gas liquid chromatography disclosed less than 1% of monomer charge present in monomeric form; gel permeation chromataography disclosed the maximum weight fraction at ca. 1300, with 90 weight % distribution between 450 and 2600 molecular weight units (based on MMA calibration).

EXAMPLE 32

This example shows the preparation of a typical oxazolidine copolymer of the invention by copolymerization of an alkyl methacrylate and oxazolidinylethyl methacrylate in the presence of 2-hydroxyethyl oxazolidine.

To a 3 l. 3-neck glass reaction flask equipped with reflux condenser, mechanical stirrer, Y-arm adaptor with thermometer and addition funnel, all under dry N$_2$ are charged: 45 g. xylene, 126.6 g. (1.08 mole) distilled 2-hydroxyethyl oxazolidine (HEOX) (bp 102–104 at 10 mm. Hg) and 11.1 g. (0.15 mole) potassium·methoxide or 16.80 g. potassium t-butoxide (0.15 mol, 1.5 mole % of total monomer charge). The slurry is warmed with stirring, becoming a clear, pale yellow solution at 60° C. While maintaining the reaction at 60° C., over a 30 minute period, 511 g. (3.60 mol, 36 mole % of total monomer charge) butyl methacrylate is added. The reaction mixture is maintained at 60° to 65° C for a period of 2 hours to allow first stage polymer formation. The color of the reaction mixture gradually changes from yellow to deep amber; heat evolution increases gradually throughout the period with a sustained exotherm at the end which is limited to 65° C with air cooling. The orange mixture increases in viscosity to a thin oil (Gardner-Holdt viscosity at 25°, > B); gas chromatographic analysis indicates an essentially quantitative conversion of butyl methacrylate to first stage polymer.

The second stage is commenced with the gradual addition over a one-hour period of 739 g (5.20 mole, 52 mole % of total monomer) butyl methylacrylate, 239 g (1.20 mole of 2-(1,3-oxazolidin-3-yl)ethyl methacrylate, additionally containing 0.12 mole HEOX (present as an impurity), in 250 g xylene. Cold water cooling is used to maintain a 60°–63° C reaction temperature throughout the exothermic addition. The mixture thickens gradually with addition/conversion. After addition is completed, the amber oil is stirred at 60° C for 30 minutes, and gas chromatographic anaylsis indicates essentially quantitative conversion of monomers to polymer.

A Dean-Stark trap is installed in place of the Y-arm adaptor and addition funnel. The mixture is warmed to 60° C, charged with 49.0 g of 15% aq. H$_2$SO$_4$ (0.075 mol, 100 eq. % on potassium t-butoxide) and stirred for 15 minutes at 60° C. Then 100 g of 25% aqueous Al$_2$(SO$_4$)$_3$.18 H$_2$O (0.0375 mol, 50 eq. % on total potassium) is charged. This is followed by rapid azeotropic distillation at reduced pressure to remove water (126 g) and xylene (14 g).

The reaction mixture is diluted with 793 g of xylene (reducing solids to 60–63%) and cooled to 25°. After 1 ½– 2 hours of slow stirring at 25°, 13.5 g. of Hy-flow Super-cel filter aid is stirred in and the reaction mixture is pressure filtered.

The filtrate is recharged to a clean, dry, 3-liter flask and xylene is removed at reduced pressure to afford a clear yellow oil at 88.7% solids containing 1.31 meq. oxazolidine/g solution (1.48 meq./g. solids), viscosity 6–7,000 cps (25° C), $\overline{M}w$ ca. 1350, with 90 weight % distribution 450–2800.

A clear, moisture curable lacquer suitable for spray application can be formulated by blending a 2/1 isocyanate/oxazolidine molar ratio of a polyfunctional isocyanate (such as Desmodur N, toluene diisocyanate, isophorone diisocyanate, or the like) and the oxazolidine-containing polymer described above at 70% solids in xylene.

EXAMPLE 33

Preparation of Mono- and Bis-Carboxylic Acids

The following procedure is representative of the preparation of mono- and bis-carboxylic acids of the polymers of the invention with known molecular weight distribution.

Ninety grams of the polymeric BMA (96% by weight in residual BMA monomer) of Example 11 is taken up in 40 g. isopropanol and warmed to 50° C. To the stirred solution is added dropwise 6.9 g. (87 mmole which includes a calculated excess for the residual monomer) of 50% sodium hydroxide and several grams of water. Within several minutes the solution clouds as the lower molecular weight salts such as sodium methacrylate and lower acids precipitate. The mixture is stirred at reflux for 2 hours, cooled and acidified with 90 mmole HCl in 150 g. water, taking final pH below 3. The bulk of the cooled aqueous layer is decanted and the remaining oily product is washed with two 50 ml. portions of water and separated. The combined aqueous washings are extracted with two 40 ml. portions of toluene and the toluene extracts added to the product. Azeotropic distillation of residual isopropanol, water and butanol to toluene reflux followed by aspirator filtration of the warm product, gives 82 g. (92% recovery) of a pale yellow, nearly clear oil of 95 weight % solids in toluene, containing 0.44 meq. $CO_2H$ per gram (approximately 7 equiv. percent of total ester functionality).

The bis-acid is prepared similarly, employing approximately twice the level of aqueous sodium hydroxide and a 10 to 12 hour reflux period. Similar work-up gives 76 g. of a clear, colorless viscous oil of 91 weight % solids in toluene (83% recovery). Titration shows 1.05 meq. $CO_2H$ per gram (approximately 16 equiv. % of total ester functionality).

Gel permeation chromatographic analysis of the acid products discloses the molecular weight distributions to be essentially identical with the neutral ester precursors.

EXAMPLE 34

Preparation of Bis and Higher Carboxylic Acids

The following procedure is representative of a direct saponification to the bis-acid salt followed by a prolonged saponification step and work up for the tris acid. Potassium hydroxide can provide faster rates under mild thermal conditions.

To 1220 g. of a xylene solution of polymeric methyl methacrylate similar to Example 8 (82% solids, prepared with 17% methanol $\overline{M}_w$ ca. 740), containing 1000 g. polymer (9.45 ester equivalents) in a 4 l., 3-neck flask, is charged 408g (3.31 mole, 35 equivalent %, 1% excess of theoretical for bis saponification) of approximately 45% by weight aqueous potassium hydroxide (8.12 meq/g). With good agitation, the pale yellow emulsion is held at about 40° C for 1 hour, 60° C for 1 hour, then further heated, with clearing, to slow reflux with pot temperature maintained at about 80°–82° C for 2 hours. Aliquot titration discloses that greater than 97% of the hydroxide charged is converted to carboxylate.

To the clear solution at 60° is additionally charged 204g (1.66 mole, 17.5% of initial ester content, increasing total hydroxide charged to 52.5 mole%, 1.5% excess over tris acid) of approximately 45% aqueous potassium hydroxide (8.12 meq./g.). The pale yellow mixture is returned to full reflux (pot temperature about 82° to 85°) for 6 hours. The clear mobile oil is then distilled slowly to a head temperature of 82°–83°/1 atm (during 1–2 hours, pot temperature to 90° to 95° C) removing about 300 g of combined methanol, $H_2O$ and xylene distillates. Aliquot titration reveals greater than 95% conversion of charged hydroxide to carboxylate (50 mole % conversion, equivalent to 3 carboxylate groups per average chain).

To the solution are added 200 g $H_2O$ and 400 g isobutanol. With cooling to maintain 55° to 60°, 1220 g (5.05 mole, 2% excess) of 40% aqueous $H_3PO_4$ (4.14 m.mole/g.) is added over a 20-minute period. The mixture becomes white, thin and heterogeneous. After stirring an additional 15 minutes at 60° to 65°, stirring is stopped, the layers separated cleanly, and the lower water — $KH_2PO_4$ salt layer (about 1750 g) removed through a bottom stop cock. The remaining hazy — white organic layer, consisting of the product in xylene-isobutanol and containing low levels of occluded phosphate salts and water, is azeotroped dry under 150 mm Hg pressure. The mixture clears as salt granules coalesce. The warm mixture is pressure filtered, yielding 1350 g (about 94–96% recovery) of a clear pale yellow oil containing 3.06 meq. carboxylic acid per gram. The solids content of the solution is 60% in xylene-isobutanol, affording a polymeric acid product containing ca. 5.1 meq. $CO_2H/g$ solid. Gel permeation chromatographic comparison of the tris acid product with that of the starting methyl methacrylate polymer shows the expected average downward shift of molecular weight about (8 to 10%, representing the weight of methanol lost) and a decrease of several percent in lower polymer content. No substantial change in molecular weight distribution is evident by gel permeation chromatography.

In a determination of functional homogeneity of the product, the tris-acid is precipitated into four fractions by the successive, stepwise addition of a non-solvent $CCl_4$) to an acetone solution of the product. After equivalent vacuum treatment to remove most solvent, each of the isolated fractions melts in the range of 80° to 100° C, contains 4.2–4.7 meq. $CO_2H/g$, and yields essentially identical gel permeation chromatography spectra.

The ammonium and alkali salts of the product yield clear, nearly colorless aqueous solutions above a pH of about 7.5 to 8. They are freed from organic solvents by normal solvent transfer methods (for example, vacuum drying, or extrusion, and dissolution, or azeotropic distillation, etc.).

Bis and higher acids and salts of other polymers and copolymers of MMA, EMA, BMA, MMA/BMA, MMA/DMAEMA, etc. of Examples 1–30 are similarly prepared. Examples 35 to 37 show two such acid polymers.

EXAMPLE 35

A polymer of methyl methacrylate $\overline{M}w$ about 700 similar to that of Example 8 at 80% solids content in toluene/xylene is treated in one charge with 55 to 56 eq. % of 50 weight % aqueous NaOH (based on total equivalents of ester; the level charged is sufficient to provide a theoretical average functionality of 3.1–3.2) at 60° to 85° C during 3–4 hours. Following the distillation of methanol, water and toluene to a head temperature of 84°/1 atm., and a subsequent reflux period of 2 hours, 95–96% of the caustic charged is in carboxylate form (2.9–3.1 functional). The crude sodium salt is treated with additional water and toluene and acidified with 150 eq. % of aqueous $H_2SO_4$ at 55°–60° C. The lower aqueous layer is drawn off and the remaining organic layer containing the crude oligomeric acid is subjected to drying by toluene azeotrope. The dried product is filtered free of traces of residual inorganic sulfate salts to provide a clear oil in greater than 90% recovery.

The product solution contains 70–80% by weight of acid-containing polymer having an acid number of 260±10 (100% solids), viscosity about 50,000 cps at 75% solids (25° C).

EXAMPLE 36

A polymer of methylmethacrylate, $\overline{M}w$ about 750 (Example 8) at 80% solids in toluene is treated at 85° to 95° C during 1–2 hours with one charge of 65 equivalent % of a 45 weight % aqueous solution of potassium hydroxide (equivalent % based on total ester equivalents;equivalent weight approximately 105). Following the distillation of methanol, water and toluene, raising the batch temperature to 95° to 100° C, and a subsequent reflux period of 3 to 4 hours, 94 to 96% of the potassium hydroxide charged is in carboxylate form (ca. 4.1 to 4.3 functional). The crude potassium salt is treated with 105 equivalent % of concentrated sulfuric acid at 45° to 65° C and a suitable solvent to retain solubility of the organic acid (ketones, ester solvents, etc.). The sulfate salt is removed by centrifugation or repeated water washes. The organic layer is vacuum azeotropically dried at 70° to 80° C and filtered free of residual insoluble inorganic sulfate salts, providing a clear, light yellow product syrup with the following properties: non-volatile solids, 55 to 60%; acid number (100%), 350-375 (average functionality about 4–5; viscosity <10,000 cps at 25° C.

EXAMPLE 37

A polymer of butyl methacrylate, $\overline{M}w$ 1000 (Example 15) at 85%–90% solids in toluene is treated with 50 eq. % (based on total ester equivalents) of potassium hydroxide pellets at 60° C. The heterogeneous mixture is stirred at full reflux (85°–105° C.) for 1–2 hours until exotherm is established and the pellets dissolve and react. After two additional hours at reflux, conversion to carboxylate reaches 94% of potassium hydroxide (3.0-3.1/3.3 carboxylate functionality).

The yellow oil is worked up by procedures similar to those of Example 36 and after filtration yields a clear, pale-yellow liquid of 35,000 cps viscosity at 70% solids in toluene/n-butanol/25° C. Acid number (100% solids) is 200.

EXAMPLE 38

Preparation of Bis- and Poly-Anhydrides

A. 17.8 g of the bis-acid of the polymeric methyl methacrylate of Example 2 ($\overline{M}w$ ca. 750) is warmed under vacuum to 225° C. for 6 hours. The glassy product shows a net loss of 35 equivalent % carboxylic acid by titration and strong anhydride absorption by infrared analysis.

B. 19.2 g. of powdered bis-acid of polymeric methyl methacrylate of Example 2 and 5 eq. % powdered potassium hydroxide are intimately mixed and the melt heated at 225° C. under vacuum for 6 hours. Direct titration of the residual 17g. of hard, glassy product discloses that more than 80 equivalent % of the carboxylic acid content had been consumed. Methanolysis of the product with excess sodium methoxide in methanol, followed by back titration, indicates 35 eq. % present as reactive anhydride.

Thermal gravimetric analysis of neutral polymeric methyl methacrylate (Mw 750) of Example 2 demonstrates the rapid depolymerization of the neat polyester at 275° to 310° C., typical of methyl methacrylate. The bis-acid of the same polymer shows a 7% weight loss between 160° and 200° C. and no further weight loss below 325° C. Infrared analysis confirms the formation of the more stable bis- and poly-anhydride compounds.

EXAMPLE 39

Nonaqueous Dispersion

This example shows the use of the polymer compositions of the invention as pigment dispersants.

A mixture of 50 parts $Ti_2$, 13.2 parts at 76% solids of the polymer of Example 8, 36.8 parts of 2/1 Pine Oil/-Texanol, 2 parts of the low molecular weight methyl methacrylate-acid polymer of Example 33, and sand are milled 15 minutes and filtered. The lacquer blend is let down under agitation in the following order: 50 parts of the filtered grind, 24 parts at 76% solids of the polymer of Example 8, 5.6 parts of 2/1 Pine Oil/Texanol, 38 parts of 3/1 naptha/pine oil and 97.5 parts of high molecular weight methyl methacrylate dispersion polymer at 54% solids. The resulting lacquer at 47% solids content is applied to metal panels by conventional spray methods and baked dry. The resulting coatings give similar or superior properties when compared to the plasticized controls and formulations prepared with conventional nonaqueous dispersants.

When other homo- and copolymers of Examples 1 to 30 are used in formulating nonaqueous dispersions, similar advantageous properties are obtained.

EXAMPLE 40

Preparation of Polyisocyanates

This example shows the preparation of low molecular weight polyisocyanates by phosgenation of low molecular weight copolymers of tert-butylaminoethyl methacrylates.

A xylene or chlorobenzene solution containing 100 g. of the MMA/t-BAEMA copolymer of Example 22 is added dropwise to a saturated solution of phosgene in 50 g. xylene, chlorobenzene, or the like. Following the addition, the reaction temperature is raised to 125° C. while slow phosgene introduction is maintained for 10 hours. The solution is cooled to 85°, 0.16 g. (one mole %) concentrated $H_2SO_4$ is added, and the orange-yellow mixture returned to 125°–130° with a slow nitrogen sweep for 3 hours. The resulting clear amber solution consists of low molecular weight isocyanate copolymer, having 85% conversion of the original amine to reactive isocyanate, and several percent residual ionizable chloride.

The polyisocyanates when formulated and cured with polyols, polyamines, polyoxazolidines, and other active hydrogen compounds form useful coatings, adhesives, films, impregnants for leather and paper, and binders for nonwoven fabrics.

Following the above procedures, other suitable amine-containing copolymers of the invention are converted to the corresponding polyisocyanates and have a similar wide variety of uses.

EXAMPLES 41 to 44

High Solids Coatings Formulations

The following examples show representative high solids, stable, moisture-activated coatings formulated with representative oxazolidine-containing copolymers of the invention and a typical commercial tri-functional aliphatic isocyanate (such as Desmodur N, believed to be a biuret triisocyanate from hexamethylene diisocyanate and water) at 1:1 oxazolidine:isocyanate ratios. The moisture-cured systems are generally described in U.S. patent application Ser. No. 7,270, U.S. Pat. No. 3,743,626, granted July 3, 1973.

The properties of several of these coatings formulations are summarized in Table IV.

Table IV

| | | | | | | Impact (Lbs.) on Bonderite 1000 after 14 days | | Gardner-Holdt Viscosity (35 Days unexposed) |
|---|---|---|---|---|---|---|---|---|
| Ex. No. | Polymer of Ex. No. | Wt. % Solids in Aromatic Solvent | Gardner-Holdt Viscosity | Hardness (KHN) (7 days/ 25° C) | Eq. Swell Ratio (DMF) after 7 Day Cure/25° C. | Direct | Reverse | |
| 41 | 19 | 76% | X | 6.9 | 1.9 | 75 | 95 | Z-1 |
| 42 | 27 | 70% | P | 3.2 | 1.8 | 95 | 85 | X+ |
| 43 | 23 | 85% | X | 5.4 | 1.7 | 55 | 45 | — |
| 44 | 29 | 70% | V | 13 | 1.1 | 30–35 | 5–10 | Y− |

The above formulations give drying and curing rates comparable with coatings formulated with much higher molecular weight (>20,000) functional components, with practically identical mechanical properties. Such formulations are quiet useful in all areas where high polymer systems have been employed, including as coatings for metal, wood, textiles, and leather, as interior and exterior coatings, as wire "enamels," as adhesives etc.) and at much higher solids contents (75–95% vs. 30–60%).

Similar high solids reactive coatings compositions can be formulated from the other functional copolymers of the invention. Among the oxazolidine-containing polymers of the invention which are particularly useful in these reactive coating formulations are having an oxazolidine level of about 10 to about 35% by weight, preferably about 20 to about 30% by weight (calculated as 2-(1,3-oxazolidin-3-yl)ethyl methacrylate), in which the oxazolidinyl functionality is introduced by copolymerization of an alkyl methacrylate or mixture of alkyl methacryltes with a 2-(1,3-oxazolidin-3-yl)ethyl methacrylate), by polymerization of an alkyl methacrylate or mixture of alkyl methacrylates in the presence of a N-hydroxyalkyloxazolidine, or by transesterification of a polymer of an alkyl methacrylate or mixture of alkyl methacrylates with a N-hydroxyalkyloxazolidine. Preferred polymers include those in which the alkyl methacrylate is methyl methacrylate and the polymer has a weight average molecular weight of about 800 to about 1600, those in which tha alkyl methacrylate is butyl methacrylate and the polymer has a weight average molecular weight of about 1000 to about 2000, and preferably about 1200 to about 1500, and those in which a mixture of methyl and butyl methacrylates is used, in which the methyl methacrylate is about 5 to about 95% by weight, preferably about 20 to about 80% by weight, of the mixture, and in which the polymer has a weight average molecular weight of about 850 to about 1900, and preferably about 1000 to about 1500.

EXAMPLE 45

Polyol Formation from Low Molecular Weight Methyl Mechacrylate Polymer and 1,3-Butylene Glycol Transesterification of 155 g. of a methyl methacrylate polymer prepared according to Example 1, having a $\overline{M}n$ of 450, with 153 g. (1.7 moles) 1,3-butylene glycol in the presence of 7 g. (62 mmole, 3.6 eq. %) potassium tert-butoxide at 100° C., employing a slow nitrogen sparge, yielded 22 g. of distillate in 15.5 hours. Another 2.3 g. distillate resulted after 19 hours at 130° C. following by 0.8 distillate after 7 hours at 160° C. The reaction was completed at 200° C. for 16 hours yielding a total of 36 g. distillate. The catalyst was quenched with methanolic HCl; excess methanol and butylene glycol were distilled in vacuo at 150° C./7 mm., ending with a nitrogen sparge. The cooled product was taken up in toluene, treated with filter aid and filtered warm. Removal of toluene in vacuo yielded 205 g. of a clear, light solid with hydroxyl no. 190 and an $\overline{M}n$ of 825 (by ebulliometry).

EXAMPLE 46

Polyol Formation from Low Molecular Weight Butyl Methacryalte Polymer and 1.3-Butylene Glycol Following the procedure of Example 45, 172 g. of a polymer of butyl methacrylate prepared according to Example 1 having an $\overline{M}n$ of 1000, and 77.3 g. (0.86 mole) 1,3-butylene glycol are reacted in the presence of sodium methoxide catalyst at 175° to 200° for 70 hours. Catalyst neutralization, distillation and filtration, as described in Example 50 yielded 173 g. of a light yellow, viscous oil with hydroxyl no. 107 and an Mn of 1265.

EXAMPLE 47

Polyol Formation from Low Molecular Weight Methyl Methacrylate/Butyl Methacrylate Copolymer and Ethylene Glycol A 1 liter, four-necked, round bottom flask is fitted with a mechanical stirrer, a nitrogen ebullator, a thermocouple and a temperature controller, a heating mantle atop a pot-lifter, and a condenser atop a Dean-Stark trap. The flask is charged with 441 g (0.533 mole) of a methyl methacrylate/butyl methacrylate polymer similar to the polymer of Example 17 (89% solids in xylene) and 274 g. (4.42 moles) of ethylene glycol. The mixture is heated at reflux at atmospheric pressure while maintaining a gentle nitrogen sparge (about 25 ml./min.) to dry the ethylene glycol by separation of the water-xylene azeotrope. As the lower water layer was drawn off, the temperature of the distillate rises to 150° C., at which point the azeotrope is composed of xylene and ethylene glycol. At the point, the lower layer is returned to the reaction flask while the upper (xylene) layer is removed. This procedure is continued until xylene ceases to codistill with the glycol. The pot temperature then reaches about 195° C.

The dried reaction mixture is cooled to 60° C. and the condenser and Dean-Stark trap are replaced with a distillation head atop a 10 inches column packed with porcelain saddles. The apparatus is provided with an ice-cooled receiver and a dry ice acetone cooled trap. Sodium methoxide solution (19.7 g., 92.7 meq., 25% solution in methanol, 4.7 meq./g. of sodium methoxide) is charged to the flask and heating is begun while a nitrogen sparge of 25 ml./min. is maintained. Distillation is begun as the pot temperature reaches 145° C. The temperature controller is set such that the head temperature is not allowed to exceed 100° C.

After 3 hours, with 61.2 g. of distillate collected, the rate of reaction has slowed considerably. The mixture is cooled to 60° C. and 9.4 g. (44.2 meq.) of a 25% solution of sodium methoxide catalyst in methanol is charged. Heating at 195° C is resumed and over the next 8 hours an additional 28 g. of distillate is collected. Gas chromatography shows the total distillate to contain 26.8 g (0.362 mole) of n-butanol and 36.3 g. (1.134) of methanol from the transesterification reaction plus 26 g. of methanol from the two catalyst charges. The total moles (1.5) of displaced alcohols provides a theoretical hydroxyl functionality of 2.8 for the product. Gas chromatographic analysis of the distillate on the same column operated at 120° C. shows no xylene contamination.

The reaction mixture is cooled to 100° C., 8.1 g (151 meq., 10% excess) granular ammonium chloride is added, and the reaction mixture is maintained at that temperature with vigorous stirring for 1 hour in order to ensure complete catalyst neutralization. Excess ethylene glycol is then distilled at reduced pressure (20 mm.) at a maximum pot temperature of 190° C. and a maximum nitrogen sparge of 800 ml./min. During the distillation, ammonia is vigorously evolved from the decomposition of the ammonium carboxylate salt. When distillation ends, gas chromatographic analysis shows the glycol distillate contains an additional 3.32 g. (0.045 mole) of n-butanol, thereby raising the theoretical functionality to 2.9, the reaction mixture is cooled to 140° C and the crude product is taken up in 120 g of xylene. The solution is filtered while hot through a Celite pad and the filtrate is returned to a clean flask. The solution is heated at reflux at atmospheric pressure over a Dean-Stark trap ($N_2$ sparge of 25 ml./min.) to remove remaining traces of ethylene glycol by distillation of the glycol/xylene azeotrope. When glycol distillation ceases, the xylene solvent is removed at reduced pressure, ultimately, at 190° C/20 mm./$N_2$ sparge of 800 ml/min. and then held at these conditions for 1 hour after the apparent end of the distillation.

The product is transferred at 100% solids while warm and provides the following analytical results:
Acid Number: 13.3
Hydroxyl Number: 156.6
$\overline{M}n$ (GPC): 1044; $\overline{M}w/\overline{M}n$: 1.44
Functionality (hydroxyl): 3.2
Total chlorine content: 0.17%
Choride ion content: 0.01%
Carboxylate ion content: none Similar polyhydroxyl polymers can be made when other alkyl methacrylate homopolymers and copolymers of the invention are reacted according to the general procedures of Examples 45 to 47 with the same or different polyol reactants. Among the preferred polyhydroxyl polymers of the invention are those derived from methyl methacrylate, having a weight average molecular weight of about 800 to about 2000, preferably about 900 to about 1200, and a hydroxyl number of about 120 to about 280, preferably about 150 to about 220, those derived from butyl methacrylate, having a weight average molecular weight of about 1000 to about 2500, and a hydroxyl number of about 100 to about 250, and those derived from copolymers of methyl methacrylate and butyl methacrylate, in which the methyl methacrylate constitutes about 10 to about 90% by weight of the copolymer, having a weight average molecular weight of about 900 to about 2300, and having a hydroxyl number of about 120 to about 280.

The polyhydroxyl polymers of the invention, such as those of Examples 45 to 47, are particularly useful when combined with nitrogen resins, such as ureas, melamines, and guanidines, in formulating coating systems.

EXAMPLES 48 and 49

Pigmented Coating Formulations

Examples 48 and 49 show typical pigmented and clear reactive coating formulations which comprise a polyhydroxyl polymer of the invention and a melamine or urea derivative. Table V summarizes the properties of two typical pigmented coating systems in which the coreactant is hexamethoxymethyl melamine (Cymel 301). In Example 48, the polyhydroxy polymer is that of Example 47 and in Example 49, the polyhydroxyl polymer is derived from a homopolymer of methyl methacrylate, prepared by the process of Example 1 and transesterified by the process of Example 47, and having a weight average molecular weight of about 1200 to about 1500 and a hydroxyl number of about 200 to 205. The polyhydroxyl polymer and the coreactant are mixed at a 70 to 30 weight ratio (polyol to coreactant), applied to unprimed Bonderite steel panels to give 1 to 2 mil films, cured at 300° F for 30 minutes, and evaluated by standard testing procedures.

Table V

| | Pigmented Coatings | |
|---|---|---|
| | Example 48 | Example 49 |
| Pigment (% on Binder) | 45%[1] | 50%[2] |
| Spray Solids[5] | 80% | 71% |
| Acid Catalyst[6] | 0.2% | 0.1% |
| KHN Hardness | 16 | 26 |
| Gloss, 60° | 96 | 94 |
| Impact (Dir/Rev.) | 20/<2 | 15/<2 |
| Print[3] | Trace | None |
| Knife Adhesion | Fair/Good | Fair/Good |
| Stain Resistance[4] | OK | OK |
| Solvent Resistance | 6H | 7H |
| Initial Pencil Hardness | | |
| 60'/Cellosolve Acetate | 5H | 7H |

[1]Pigment, Ti pure (DuPont) R-966.
[2]Pigment, Titanox RA.
[3]Print at 180° F/2 psi for 30 min.
[4]Stains; Mustard, Ink, 50% $H_2SO_4$; all 1 hour/25° C.
[5]In methyl n-butyl ketone
[6]p-Toluenesulfonic Acid

EXAMPLE 50

Spray Applied Coating Formulation

This example shows a typical enamel formulation for a spray-applied appliance coating

| A. Roller Mill Dispersion | |
|---|---|
| TiO$_2$ | 50.0 |
| Polyhydroxy Polymer of Example 47 | 40.0 |
| Methyl Butyl Ketone | 10.0 |
| | 100.0 |
| B. Enamel Let Down | |
| Roller Grind (A) | 72.0 |
| Polyhydroxy Polymer of Example 47 | 2.0 |
| Methyl Butyl Ketone | 0.5 |
| Hexamethoxymethyl melamine (Cymel 301) | 13.2 |
| Methyl Butyl Ketone | 11.7 |
| p-Toluenesulfonic Acid (30% in isopropanol) | 0.6 |
| | 100.0 |
| 0.1% FC-431 fluorocarbon flow aid. | |
| C. Enamel Constants | |
| Pigment 50% | |
| Binder 50%: 70% polyol | |
| 30% Cymel 301 | |
| 0.4% p-TSA catalyst | |
| Enamel Solids: 80% by weight (ca. 65% by volume) | |
| Enamel Viscosity: 25 seconds, No. 4 Ford Cup | |

EXAMPLE 51 polyurethane Prepolymer Formation with Low Molecular Weight Polyol Intermediates Thirty one grams of butyl methacrylate/butylene glycol polyol of Example 46 is taken up and dissolved with warming in 66 g. toluene. Thirteen grams of isophorone diisocyanate and 0.08 g. dibutyltin dilaurate catalyst are charged and the solution held at 60° C. for 20 hours. The resulting clear, pale yellow solution is vacuum stripped to 85% solids and contains 1.0 meq. per gram of terminal, nonvolatile isocyanate functionality with a Gardner-Holdt viscosity of E to H.

The prepolymer forms useful adhesive and coatings compositions with appropriate polyols, polyamines, moisture activated poly-oxazolidines (for example, those of Examples 40–43), masked polyimines, and the like.

Similar compositions are formed when the polyols of Examples 45 and 47 are substituted in the above compositions, and when other polyols, prepared from polymers of the invention according to the procedures of Examples 45 to 47 are substituted in these compositions.

EXAMPLE 52

Ethoxylation of Acid-Containing Polymer

This example shows the preparation of a typical polymer of the invention which contains both carboxyl and hydroxy functionality. Into a 1 liter auto-clave are placed 221 g. of polycarboxyclic acid prepared according to the procedure of Example 37 from the butyl methacrylate polymer of Example 15 (67% by weight solids in toluene/ n-butanol, having an acidity of 5.7 meq./g. of solids), 22.1 g of ethylene oxide, 0.74 g. of tetrapropylammonium bromide, and 75 g of toluene (to adjust polymer solids to 50% by weight). The reactants are heated to 100° C with constant stirring and held at 100° C for 4 hours. During this time, the pressure drops from about 23 psi down to about 4 psi. After cooling, the product is washed out of the auto-clave with acetone and stripped on a rotary evaporator at 90° C/10mm for 2 hours yielding 170g solids of pale-yellow glassy product. The product has a viscosity at 40% solids, pH 9, in water of 45 cps; a hydroxyl number of 181; Mn of 1040 and Mw of 1320.

Similar polymers having both carboxyl and hydroxyl functionality can be prepared by the general procedures described above by reacting acid-containing polymers of the invention with suitable alkylene oxides, such as ethylene oxide, propylene oxide, or butylene oxide or with various polyols such as ethylene glycol, propylene glycol, 1,3-butylene glycol, and the like. Among the preferred polymers of the invention having both carboxyl and hydroxyl functionality are acid-contaning polymers of methyl methacrylate and butyl methacrylate, such as those prepared according to the procedures of Example 33 to 37, partially esterified with ethylene oxide or propylene oxide, and having an acid number of about 80 to about 140, a hydroxyl number of about 140 to about 260, and a weight average molecular weight of about 800 to about 1600.

The polymers of the invention as described above which contain both carboxyl and hydroxyl functionality are particularly useful when combined with nitrogen resins, such as melamines, ureas, and guanidines, in formulating reactive coating systems.

EXAMPLE 53

Water-Borne Enamel

This example shows a typical water-borne enamel formulation and the properties of coatings derived from this formulation.

A 60% weight solution of the ammonium salt of the polymer of Example 52 (79.5 parts by weight) is blended with hexamethoxymethyl melamine (Cymel 301, 20.5 parts by weight of 100% solids material) to give a water-borne clear enamel with a solids weight ratio of 70 polymer/ 30 melamine. The enamel is air-sprayed on steel panels, and baked for 30 minutes at 350° F to give hard films having a thickness of about 1.8 to 2.0 ml. The cured coatings are then evaluated by standard procedures and have the following properties:

| | |
|---|---|
| KHN | 13.7 |
| Direct Impact (in lbs.) | 15 |
| Cold Crack, 10 cycles[1] | Pass |
| Gasoline Resistance[2] | |
| 0 time, Pencil Hardness | 6H |
| 15 minutes | 5H |
| Water Resistance[3] | Pass |
| MEK Swab[4] | Pass |

[1] −60° F to 150° F.
[2] Arco Supreme, leaded.
[3] 140° F/24 hr. immersion.
[4] Methyl ethyl ketone, 100 hand-wipes.

When nitrogen resins other than hexamethoxymethyl melamine and/or other polymers are used in the enamel formulations, coatings having similar useful properties are obtained. In addition, pigments may be incorporated in these formulations to provide useful pigmented coatings.

Preparation of Epoxide-Containing Polymers

A 1 liter, 3-necked round bottom 6-flask, fitted with stirrer, thermometer, a condenser atop a Dean-Stark trap, drying tube, and temperature controlled oil-bath on an automatic pot-lifter, is charged with 215g. (500 meq. acid, at 2–32 meq./g. as 73% solids in xylene) of the bis acid of the methyl methacrylate polymer of Example 8, as prepared by procedures of Example 34. Aqueous potassium hydroxide (7-77 meq./g., 3.86g., 30 meq., 6 eq.%) is added and the reaction mixture is heated at reflux under reduced pressure (about 100mm) until water thoroughly removed by azeotropic distillation. The reaction mixture is cooled to 90° C. and epichlorohydrin (50.8g., 550 meq.) is added.

The reaction mixture is held at 90° to 95° C. for 12 hours, at which time titration of an aliquot disclosed that more than 99% of the free carboxylic acid has been consumed. The mixture is lightly hazy due to precipitated potassium chloride.

The crude chlorohydrin ester, diluted to 50% solids with toluene. A wet test meter is attached to the exit of the reflux condenser to monitor the evolution of carbon dioxide. The reaction mixture is heated to reflux (head temperature about 118° C.; pot temperature 122°-125° C.) over a Dean-Stark trap to remove water. Anhydrous powdered potassium carbonate (138g., 1 mole) is added in four equal portions during the next 3 hours with vigorous agitation. The reflux is continued for another 9 hours until $CO_2$ evolution was ceased. The reaction mixture is cooled to 0° C. with an ice bath and 250 ml. of 3 N hydrochloric acid (750 meq.) are added below 25° C. Agitation is stopped and the phases separated. The lower aqueous phase is drained off.

The crude product solution is dried by azeotrope at reduced pressure via Dean-Stark trap, keeping pot temperature less than about 50° C. until water is essentially completely removed. Solids are adjusted to about 75% whereupon the product is filtered. The resulting clear light yellow product is recovered in greater than 95% yield and gives an epoxide titer equivalent to 80% of theoretical (based on original acid level), with nil acid titer (acid No. <10) and <1% residual epichlorohydrin; viscosity is less than 2,000 cps at 75% solids at 25° C.

Following the procedures of Example 54, several additional epoxy-functional polymers are prepared. The properties of these are given in Table VI.

To the solution is charged 8.5g. (120 eq.%) of epichlorohydrin and the mixture is held at 70° × 5° C. for 3 hours. Titration disclosed that greater than 98% quaternization has occurred. The solution is quenched with excess hydrochloric acid and water is added to reduce solids to 18%. The intermediate solution viscosity is less than <30 cps at 25° C., pH 2.1.

(b) Epoxy Functionalization

Intermediate chlorohydrin is functionalized in situ by addition of one equivalent of base, increasing pH to 7.0 to 8.5. Within several hours of standing at 25°–35° C., stoichimetric levels of chloride ion are released and epoxy titration methods disclose greater than 80% of theoretical epoxide present in situ. Other procedures useful in preparing these epoxy-functional polymers and uses for the polymer are disclosed in U.S. Pat. No. 3,678,098, granted July 18, 1972 to Lawis et al.

It is to be understood that changes and variations may be made without departing from the spirit and scope of the invention as defined by the appended claims.

We claim:

1. An anionically-polymerized addition polymer of at least one ester of methacrylic acid, the polymer comprising mers having condensation-crosslinkable functionality, wherein the average chain length of the polymer, $\bar{n}$, is about 6 to about 50 mers.

2. The polymer of claim 1 wherein the anionically-polymerized polymer is an alkoxide-polymerized polymer.

3. The polymer of claim 2 wherein at least about 85% by weight of the molecules of the polymer have chain lengths of about $\sqrt{2\bar{n}}$ to about $2\bar{n}$ mers.

4. The polymer of claim 3 wherein the average chain length is about 6 to about 25 mers.

5. The polymer of claim 3 wherein the polymer is a copolymer of at least one ($C_1$–$C_{24}$)alkyl methacrylate and at least one copolymerizable ethylenically-unsaturated ester of methacrylic acid having condensation-crosslinkable functionality.

6. The polymer of claim 5 wherein the copolymeriz-

TABLE VI

| | | EPOXY-FUNCTIONAL POLYMERS | | | |
|---|---|---|---|---|---|
| EXAMPLE NO. | PRECURSOR COMPOSITION | ACID PRECURSOR FUNCTIONALITY | EPOXIDE TITER (100% SOLIDS) | $\bar{M}n$ (GPC) | CALCULATED EPOXY FUNCTIONALITY |
| 55 | MMA (Example 8) | 1.8 | 2.24 meq./g. | 840 | 1.9 |
| 56 | MMA (Example 8)$^{(2)}$ | 4.1 | 2.40 | 1190 | 2.9 |
| 57 | BMA (Example 15) | 3.5 | 2.33 | 1385 | 3.2 |
| 58 | BMA (Example 15) | 3.9 | 2.98 | 1280 | 3.8 |

$^{(1)}$Epoxide functionality = $\frac{\text{meq. epoxide/g. (100\%)} \times \bar{M}n \text{ (GPC)}}{1000}$ (approx.)

$^{(2)}$Prepared with 9% methanol; $\bar{M}w$ 1100.

EXAMPLE 59

Quaternization and Epoxy Functionalization of an Amino Containing Polymer (a) Intermediate Chlorohydrin Formation

To a suitable reaction flask is charged 50g. of the butyl methacrylate analog copolymer of Example 17A (84% solids, 1–53 meq. amine/g.). With gentle agitation 136g. (90 eq.% on amine) of 0.50 N hydrochloride acid is blended in. The mixture is vacuum stripped on a rotating evacuator at about 70° to 80° C., removing 100g. of water. The stripped water is replaced with deionized water; the pH of the medium is 4–9 and titration disclosed 0.39 meq./g. (th. 0.4) of weak ammonium acid content with pKa Ca 6.3–6.5.

able ester is 2-oxazolidinylethyl methacrylate, 2-(2-isopropyloxazolidinyl)ethyl methacrylate, or t-butylaminoethyl methacrylate.

7. The polymer of claim 6 wherein the alkyl methacrylate is a ($C_1$–$C_4$)alkyl methacrylate.

8. The polymer of claim 7 wherein the alkyl methacrylate is methyl methacrylate.

9. The polymer of claim 3 wherein the polymer comprises mers having the structure wherein Y is a halogen atom, an amino group, a ($C_1$-$C_4$)-alkylamino group, a di($C_1$-$C_4$)alkylamino group, a hydroxy($C_1$-$C_4$)alkylamino group, a bis-hydroxy($C_1$-$C_4$)alkylamino group, or a group of the formula —OR, wherein R is a hydrogen atom, a ($C_2$-$C_8$)aminoalkyl group, an alkylaminoalkyl group having up to 6 carbon atoms, a ($C_2$-$C_8$)isocyanatoalkyl group, a ($C_2$-$C_8$)hydroxyalkyl group, a 1,3-oxazolidin-3-yl-$C_2$-$C_4$)alkyl group, optionally having up to two ($C_1$-$C_4$)alkyl substituents on the oxazolidinyl ring, a ($C_1$-$C_4$)aldimino($C_2$-$C_6$)alkyl group, a ($C_1$-$C_4$)aldimino($C_2$-$C_6$)alkoxyalkyl group, a ($C_3$-$C_8$)ketimino($C_2$-$C_6$)alkyl group, a ($C_3$-$C_8$)ketimino($C_2$-$C_6$)alkoxyalkyl group, a 1,3-dioxolan-4-yl($C_2$-$C_4$)alkyl group, optionally having up to two ($C_1$-$C_4$)alkyl substituents on the dioxolanyl ring, an epoxy($C_2$-$C_4$)alkyl di($C_1$-$C_4$)alkyl ammonium($C_2$-$C_4$)alkyl group, a ($C_2$-$C_8$)epoxy alkyl group, a 3-chloro-2-hydroxypropyl-dimethylammoniumethyl group, a 3-chloro-2-hydroxypropyl group, or a sodium, potassium, or ammonium cation.

10. The polymer of claim 9 wherein the polymer also comprises mers of the structure wherein $R^1$ is a ($C_1$-$C_{24}$)alkyl group.

11. The polymer of claim 10 wherein R is a ($C_2$-$C_8$)hydroxyalkyl group.

12. The polymer of claim 10 wherein R is a 1,3-oxazolidinylethyl group or a 2-alkyl-1,3-oxazolidinylethyl group.

13. The polymer of claim 10 wherein R is a hydrogen atom.

14. The polymer of claim 13 wherein the polymer also comprises mers wherein R is a ($C_2$-$C_8$)hydroxyalkyl group.

15. The polymer of claim 3 wherein the terminal group is an acid group.

16. The polymer of claim 3 wherein the initial group and the terminal group are acid groups.

17. The polymer of claim 16 wherein at least one additional group is an acid group.

18. In a process for preparing polymers of esters of methacrylic acid, the improvement which comprises carrying out the polymerization reaction in the presence of at least one chain-regulating alcohol and a catalytic amount of an alkoxide anion, while maintaining the molar concentration of the alcohol in the total monomer charge at a relatively constant value.

19. The process of claim 18 wherein the molar concentration of the alcohol is maintained at a relatively constant value of about 0.05 to about 5 molar % of the total monomer charge by adding the alcohol to the reaction at a rate consistent with the rate of polymerization.

20. The process of claim 18 wherein the molar concentration of the alcohol is maintained at a relatively constant value of about 2 to about 40 molar % of the total monomer charge by adding gradually to the reaction both the alcohol and the monomer at a molar ratio of about 1:50 to about 1:2.5

21. The process of claim 18 wherein the chain-regulating alcohol comprises an alcohol which contains at least one functional group in addition to a hydroxyl group.

22. The process of claim 21 wherein the chain-regulating alcohol comprises N-(2-hydroxyethyl)oxazolidine, t-butylaminoethanol, or dimethylaminoethanol.

23. In a process for preparing polymers of esters of methacrylic acid, the improvement which comprises carrying out the polymerization reaction in the presence of at least one chain-regulating alcohol and a catalytic amount of an alkoxide anion, polymerizing in a first stage about 20 to about 60% by weight of total monomer in the presence of the alcohol, and adding gradually the remainder of the total monomer after the first-stage polymerization has been completed.

24. The process of claim 23 wherein the molar ratio of the alcohol to the monomer in the first stage is about 1:5 to about 1:2.

25. The process of claim 23 wherein the chain-regulating alcohol comprises an alcohol which contains at least one functional group in addition to a hydroxy group.

26. The process of claim 25 wherein the chain-regulating alcohol comprises N-(2-hydroxyethyl)oxazolidine, t-butylaminoethanol, or dimethylaminoethanol.

* * * * *

UNITED STATES PATENT AND TRADEMARK OFFICE
CERTIFICATE OF CORRECTION

PATENT NO. : 4,103,093
DATED : July 25, 1978
INVENTOR(S) : Sheldon N. Lewis et al.

It is certified that error appears in the above-identified patent and that said Letters Patent are hereby corrected as shown below:

The term of this patent subsequent to November 1, 1994 has been disclaimed.

*Signed and Sealed this*

*Eighteenth Day of December 1979*

[SEAL]

*Attest:*

*Attesting Officer*

SIDNEY A. DIAMOND

*Commissioner of Patents and Trademarks*